(12) United States Patent
Fujita et al.

(10) Patent No.: US 10,566,815 B2
(45) Date of Patent: Feb. 18, 2020

(54) CHARGE CONTROL APPARATUS, CHARGE PATTERN CREATING DEVICE, METHOD, NON-TRANSITORY COMPUTER READABLE MEDIUM AND POWER STORAGE SYSTEM

(71) Applicant: KABUSHIKI KAISHA TOSHIBA, Minato-ku (JP)

(72) Inventors: Yumi Fujita, Chuo (JP); Tomokazu Morita, Funabashi (JP); Ena Ishii, Yokohama (JP); Nobukatsu Sugiyama, Kawasaki (JP); Wataru Aratani, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 285 days.

(21) Appl. No.: 15/445,480

(22) Filed: Feb. 28, 2017

(65) Prior Publication Data
US 2018/0076633 A1    Mar. 15, 2018

(30) Foreign Application Priority Data
Sep. 14, 2016   (JP) .................. 2016-179878

(51) Int. Cl.
*H02J 7/00* (2006.01)
*H01M 10/42* (2006.01)
*H01M 10/46* (2006.01)

(52) U.S. Cl.
CPC .......... *H02J 7/007* (2013.01); *H01M 10/425* (2013.01); *H01M 10/46* (2013.01); *H02J 7/0008* (2013.01); *H02J 7/0047* (2013.01); *H01M 2010/4271* (2013.01); *H01M 2010/4278* (2013.01); *H01M 2220/20* (2013.01); *H01M 2220/30* (2013.01)

(58) Field of Classification Search
USPC ......................................................... 320/107
See application file for complete search history.

(56) References Cited

U.S. PATENT DOCUMENTS

| | | | |
|---|---|---|---|
| 4,092,690 | A | 5/1978 | Wilkinson |
| 9,213,070 | B2 | 12/2015 | Hoshino et al. |
| 9,246,344 | B2 | 1/2016 | Suzuki et al. |
| 9,368,995 | B2 | 6/2016 | Nishino et al. |
| 9,496,742 | B2 | 11/2016 | Suga et al. |
| 9,825,474 | B2 | 11/2017 | Tohara et al. |

(Continued)

FOREIGN PATENT DOCUMENTS

| | | |
|---|---|---|
| CN | 104871398 A | 8/2015 |
| CN | 105027379 A | 11/2015 |

(Continued)

OTHER PUBLICATIONS

Extended European Search Report dated May 31, 2017 in Patent Application No. 17158087.1.

*Primary Examiner* — Robert Grant
(74) *Attorney, Agent, or Firm* — Oblon, McClelland, Maier & Neustadt, L.L.P.

(57) ABSTRACT

A charge control apparatus according to an embodiment controls charge of a secondary battery to be charged, on the basis of a charge pattern which is calculated from inner state parameters of the secondary battery to be charged, and of a deterioration model or deterioration map of a secondary battery. The charge control apparatus updates the charge pattern on the basis of change of the inner state parameters.

14 Claims, 18 Drawing Sheets

(56) References Cited

U.S. PATENT DOCUMENTS

| | | |
|---|---|---|
| 9,985,451 B2 | 5/2018 | Yau |
| 2010/0207583 A1 | 8/2010 | Tanaka et al. |
| 2013/0314050 A1 | 11/2013 | Matsubara et al. |
| 2014/0222358 A1 | 8/2014 | Morita et al. |
| 2016/0013670 A1* | 1/2016 | Tohara ............... H01M 10/441 320/112 |
| 2016/0028263 A1* | 1/2016 | Yau ...................... H02J 7/0021 320/107 |
| 2016/0118816 A1 | 4/2016 | Honkura |
| 2016/0297318 A1 | 10/2016 | Kirimoto |

FOREIGN PATENT DOCUMENTS

| | | |
|---|---|---|
| JP | 2003-109672 | 4/2003 |
| JP | 3692547 | 9/2005 |
| JP | 2007-323999 A | 12/2007 |
| JP | 2010-21132 | 1/2010 |
| JP | 2012-251806 | 12/2012 |
| JP | 2013-143206 | 7/2013 |
| JP | 2013-247003 | 12/2013 |
| JP | 2014-149280 A | 8/2014 |
| KR | 10-1549360 B1 | 9/2015 |
| WO | WO 2012/127775 A1 | 9/2012 |
| WO | WO 2013/046690 A1 | 4/2013 |
| WO | WO 2014/147753 A1 | 9/2014 |
| WO | WO 2015/098012 A1 | 7/2015 |

* cited by examiner

CHARGE CONTROL APPARATUS, CHARGE PATTERN CREATING DEVICE, METHOD, NON-TRANSITORY COMPUTER READABLE MEDIUM AND POWER STORAGE SYSTEM

CROSS-REFERENCE TO RELATED APPLICATION(S)

This application is based upon and claims the benefit of priority from Japanese Patent Application No. 2016-179878, filed Sep. 14, 2016; the entire contents of which are incorporated herein by reference.

FIELD

Embodiments described herein relate generally to a charge control apparatus, a charge pattern creating device, a method, a non-transitory computer readable medium and a power storage system.

BACKGROUND

As downsizing of information-related devices, communication devices, and the like has been achieved, lithium ion secondary batteries having high energy density and being capable of achieving downsizing and light weights are widely used as power sources for such devices. Also in the fields of electric vehicles (EV) and natural energy power generation, secondary batteries have attracted attention. Accordingly, quick charge for shortening a charge time of a secondary battery is being desired.

As a charge method for secondary batteries, a charge method using constant current or constant electric power has been adopted. For example, in such a charge method, charge is performed using constant current until the voltage of a secondary battery reaches a set voltage, and thereafter, the current value is controlled so as to keep the set voltage.

To perform quick charge by the above charge method, the current value of the constant current may be set high in a period (constant-current charge period) in which charge is performed using the constant current. However, if the current value is high, the performance of storing electricity in a secondary battery, such as a battery capacity and an internal resistance are greatly deteriorated. In addition, deterioration of the storage battery is quickened, and thus, the lifetime of the storage battery is shortened.

To prevent the lifetime of a storage battery from being shortened, a method in which the value of constant current is adjusted on the basis of the characteristics of a secondary battery is known. For example, a method is known in which a constant-current charge period is divided into a plurality of sections on the basis of the internal resistances or the like of the electrodes in a secondary battery and the value of constant current is adjusted in each section. However, the characteristics such as the internal resistances of electrodes vary according to use. Thus, unless the battery characteristics are accurately obtained, quick charge efficiency may be reduced, and further, deterioration of the storage battery may be quickened. In addition, advanced processing for measuring the internal resistances is required so that a process load is increased and the size of the device becomes large. Alternatively, in order to cause an external device to measure the internal resistances, an effort to remove the secondary battery is required.

DETAILED DESCRIPTION

The value of current for charging a secondary battery is calculated on the basis of the voltage and the current of the secondary battery, while deterioration of the secondary battery is considered.

A charge control apparatus according to an embodiment controls charge of a secondary battery to be charged, on the basis of a charge pattern which is calculated from inner state parameters of the secondary battery to be charged, and of a deterioration model or deterioration map of a secondary battery. The charge control apparatus updates the charge pattern on the basis of change of the inner state parameters.

Below, a description is given of embodiments of the present invention with reference to the drawings. The present invention is not limited to the embodiments.

First Embodiment

Figure 1:
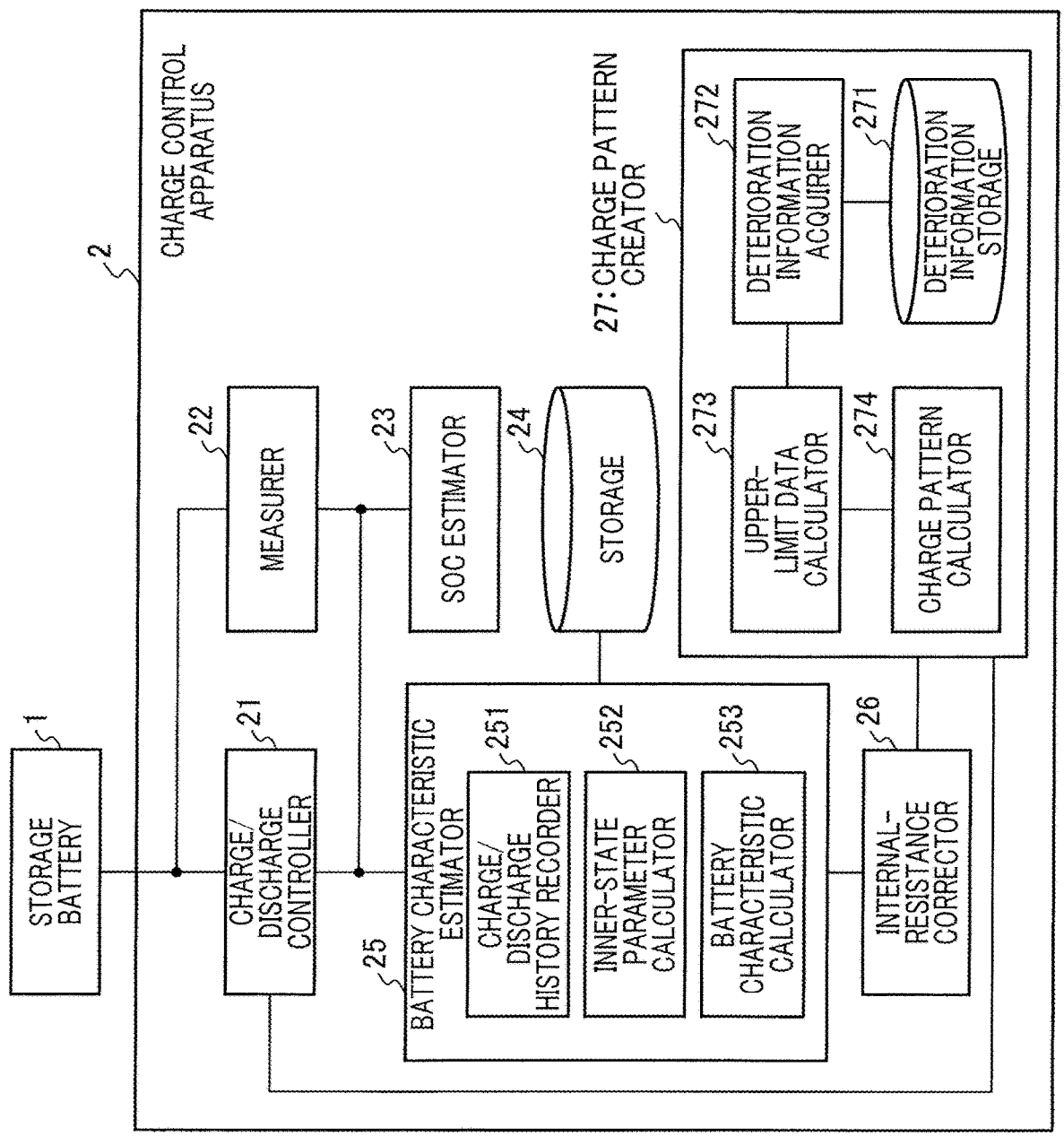
FIG. 1 is a block diagram illustrating an example of a schematic configuration of a power storage system including a charge control apparatus according to a first embodiment.

FIG. 1 is a block diagram illustrating an example of a schematic configuration of a power storage system including a charge control apparatus according to a first embodiment. The power storage system includes a storage battery 1 (a first battery) and a charge control apparatus 2. The charge control apparatus 2 includes a charge/discharge controller 21, a measurer 22, an SOC (state of charge) estimator 23, a storage 24, a battery characteristic estimator 25, an internal-resistance corrector 26, and a charge pattern creator 27. The battery characteristic estimator 25 includes a charge/discharge history recorder 251, an inner-state parameter calculator 252, and a battery characteristic calculator 253. The charge pattern creator 27 includes a deterioration information storage 271, a deterioration information acquirer (reference data acquirer) 272, an upper-limit data calculator 273, and a charge pattern calculator 274.

The charge control apparatus 2 realized by a CPU circuit or the like may be provided to the storage battery 1 such that the charge control apparatus 2 is realized so as to be integrated with the storage battery 1.

The storage battery 1 is a battery to be charged by the charge control apparatus 2. The storage battery 1 may be a unit cell, or may be provided with one or more battery packs. Each of the battery packs may include one or more battery modules. Each of the battery modules may include a plurality of unit cells. The battery packs may have the same number of the battery modules, or may have the different number of battery modules. The battery modules may have the same number of unit cells, or may have the different number of unit cells.

The unit cell may be any secondary battery as long as the secondary battery can be recharged and discharged. The description herein is given assuming that the secondary battery is a lithium ion secondary battery.

In the description below, unless otherwise mentioned, the term "storage battery" includes a battery pack, a battery module, and a unit cell.

The storage battery 1 may be a storage battery for storage battery-installed devices such as cellular phones, laptop computers, electric bicycles, electric vehicles, and drones, for examples. Further, the storage battery 1 may be a stationary storage battery that is installed for each structure such as a private house, a building, and a factory. The storage battery 1 may be a storage battery linked with, or interconnected with a power generation system.

The charge control apparatus 2 controls charge and discharge of the storage battery 1. Further, the charge control apparatus 2 estimates the state of the storage battery 1 connected thereto. More specifically, the charge control apparatus 2 performs charge and discharge of the storage battery 1, and estimates, on the basis of the voltage and current data measured during the charge and discharge, inner state parameters and battery characteristics, which are information about the state of the storage battery 1. The inner state parameters and the battery characteristics will be described later.

A method for predicting the state of the storage battery 1 on the basis of the frequency of use or the number of times of use may be adopted. However, the state of a storage battery may vary depending on the use environment or a load even when the frequency of use or the number of times of use is same.

Accordingly, in order to predict the state of the storage battery 1 with high accuracy, the charge control apparatus 2 predicts the state or performance of the storage battery 1, from measurement values obtained through an inspection of charge and discharge or the like.

Furthermore, the charge control apparatus 2 creates a charge pattern according to the state of the storage battery 1. A charge pattern is assumed to represent the value of current supplied to the storage battery 1 in order to charge the storage battery 1.

That is, a charge pattern shows a constraint condition for charging the storage battery 1. Current supplied in order to perform charge is expressed as "charge current" herein. The charge control apparatus 2 charges the storage battery 1 on the basis of a calculated charge pattern.

The state of the storage battery 1 changes as a result of having been used. The change of the state deteriorates the performance of the storage battery 1. If the deteriorated storage battery 1 is charged on the basis of a charge pattern created before deterioration of the storage battery 1, not only the efficiency of charge may be reduced, but also the deterioration of the storage battery 1 may be accelerated.

Therefore, a charge pattern suitable for the storage battery 1 to be charged needs to be calculated while the state of the storage battery 1 to be charged is grasped. As a result of performing charge by a suitable charge method, the deterioration of the storage battery 1 is not accelerated and the charge speed can be increased. Furthermore, the lifetime of the storage battery 1 can be prevented from being shortened. If charge is performed under a charge condition which increases the speed in deterioration of the storage battery 1, for example, a condition in which a large current is used or charge is performed at a high temperature, a safety risk including firing is increased. A charge pattern calculated according to the present embodiment satisfies a condition for suppressing the speed of deterioration of the storage battery 1, so that the safety in charge can be necessarily ensured.

The charge control apparatus 2 is assumed to use deterioration information (reference data) in order to perform a process for calculating a charge pattern. The description of deterioration information will be given later. The description of details of operations of the charge control apparatus 2 will be also given later.

The system configuration described above is an example, and the present invention is not limited to the above configuration. For example, in FIG. 1, the charge control apparatus 2 includes the storage 24 and the deterioration information storage 271. However, the storage 24 and the deterioration information storage 271 may be configured into a single storage. In addition, the charge control apparatus 2 may be connected to a separate device or the like such that a charge pattern is outputted from the charge control apparatus 2 to the separate device. The output method here is not limited to a particular one. In the output method, a file, an e-mail, an image or the like may be used. The internal-resistance corrector 26 may be included in the battery characteristic estimator 25.

As long as information necessary for a process is received from the charge control apparatus 2 and the process result is transferred to the charge control apparatus 2 by communication or an electrical signal, the components of the charge control apparatus 2 may be outside the charge control apparatus 2. For example, as long as battery characteristics or the like are received from the charge control apparatus 2 and a charge pattern is transferred to the charge control apparatus 2 by communication or an electrical signal, the charge pattern creator 27 may be a device outside the charge control apparatus 2.

Figure 2A:
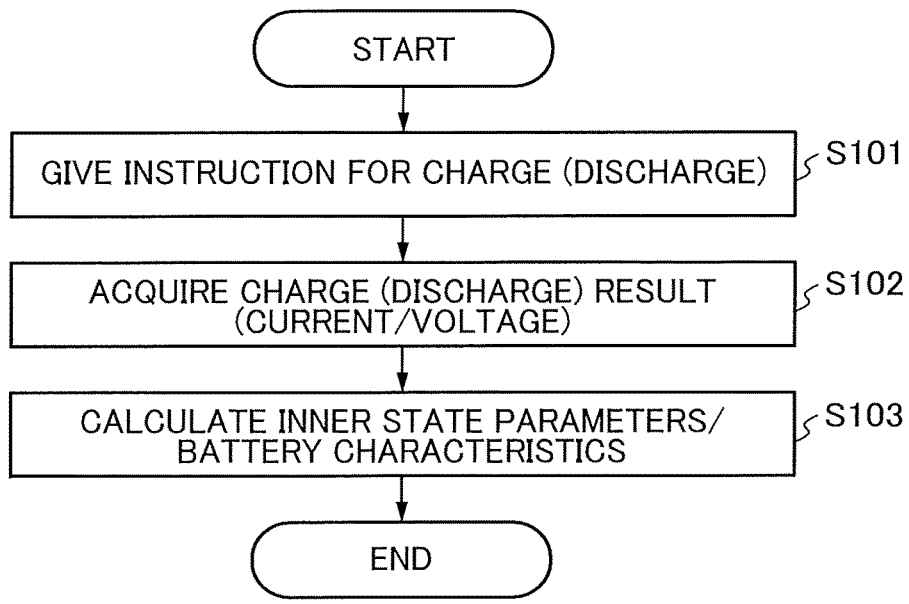
FIGS. 2A and 2B illustrate an example of a flowchart of a schematic process in the charge control apparatus.
Figure 2B:
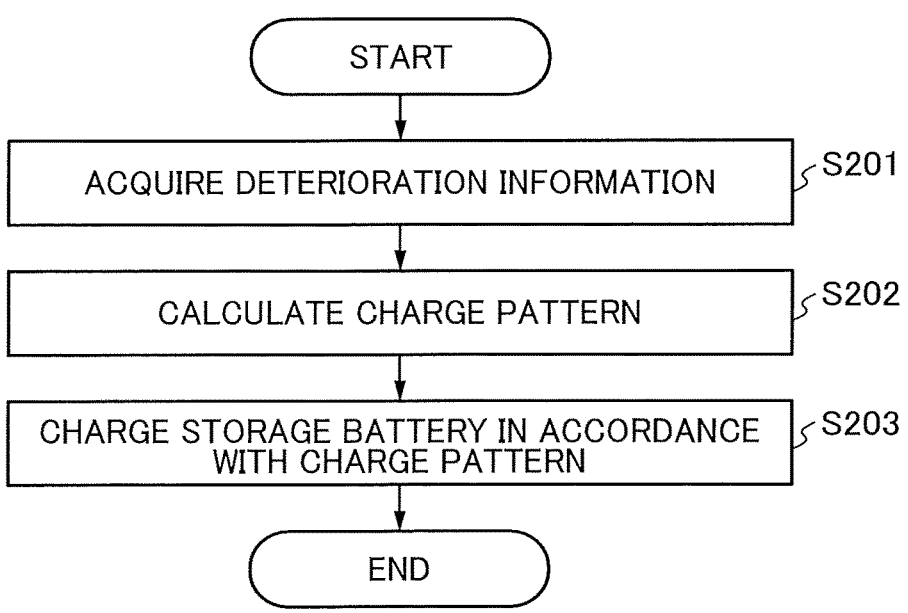

FIGS. 2A and 2B illustrate an example of a flowchart of a schematic process in the charge control apparatus. FIG. 2A illustrates a process for grasping the state of the storage battery 1. This process is performed in order to grasp the state of the storage battery 1 which has changed due to deterioration or the like, and is assumed to be performed every predetermined time period. FIG. 2B illustrates a process for calculating a charge pattern. This process is assumed to be performed after the process in FIG. 2A in order to initially create a charge pattern of the storage battery 1 or to recreate a charge pattern due to determination that the state of the storage battery 1 has changed. However, the processes may be performed at a timing other than the above.

The process for grasping the state of the storage battery 1 is described. The charge control apparatus 2 gives the storage battery 1 an instruction to be charged (or discharged) under a predetermined condition (S101). The charge control apparatus 2 acquires the charge (discharge) result from the storage battery 1 (S102), and analyzes the charge result (S103). Analyzing the charge result is calculating the inner state parameters and the battery characteristics (cell characteristics) of each unit cell on the basis of the charge result. More specifically, the inner state parameters are estimated on the basis of current and voltage data measured during the charge and discharge. Further, the battery characteristics are estimated on the basis of the inner state parameters.

The inner state parameters each indicate the state of a unit cell. The inner state parameters are assumed to include a positive electrode capacity (the mass of the positive electrode), a negative electrode capacity (the mass of the negative electrode), an SOC deviation, and an internal resistance. The SOC deviation means a difference between the initial charge amount of the positive electrode and the initial charge amount of the negative electrode.

The battery characteristics can be calculated from the inner state parameters, and represent characteristics including the voltage of the storage battery 1. The battery characteristics are assumed to include a battery capacity, an open circuit voltage (OCV), an OCV curve, and the like. The internal resistance may be included also in the battery characteristics. The OCV curve means a graph (a function) indicating the relationship between the open circuit voltage and a certain index regarding the storage battery. The battery capacity is within a range in which the positive electrode capacity range overlaps with the negative electrode capacity range. When the SOC is 100%, the potential difference between the positive electrode and the negative electrode is an end-of-charge voltage. When the SOC is 0%, the potential difference between the positive electrode and the negative electrode is an end-of-discharge voltage. In this way, the battery capacity can be calculated on the basis of a charge amount.

The process for calculating a charge pattern is described. The charge control apparatus 2 acquires deterioration information from the deterioration information storage 271 (S201). Subsequently, a charge pattern is calculated on the basis of deterioration information regarding the calculated inner state parameters or the calculated battery characteristics (cell characteristics) and the instruction value of a deterioration speed (S202). Details thereof will be described later. The charge control apparatus 2 charges the storage battery 1 in accordance with the calculated charge pattern (S203). Accordingly, charge is performed by a charge method suitable for the storage battery 1.

Next, the components included in the charge control apparatus 2 will be described.

The charge/discharge controller 21 gives the storage battery 1 an instruction to be charged or discharged under a predetermined condition. Charge/discharge is performed in order to measure the inner state parameters of the storage battery 1. The charge and discharge needs to be performed before change in the state of the storage battery 1 becomes not negligible due to progress of deterioration of the unit cells. For this reason, the charge/discharge is performed every appropriately time period, or at appropriately determined time intervals, which are determined considering variation in the battery characteristics. The charge/discharge controller 21 may also give a charge or discharge instruction when receiving an instruction from a user, another system, or the like via an input device (not illustrated).

The charge/discharge controller 21 charges the storage battery 1 on the basis of the charge pattern created by the charge pattern creator 27. Alternatively, the charge control apparatus 2 may perform the process until creation of the charge pattern is completed, and a device other than the charge control apparatus 2 may perform the charge based on the charge pattern.

The measurer 22 measures information about the storage battery 1. Examples of the information to be measured include the voltage between positive electrode terminals and negative electrode terminals of unit cells, current flowing through unit cells, and the temperatures of unit cells.

Data measured by the measurer 22 includes the voltage, the current, and the temperature of the storage battery 1 which are measured during charge or discharge of the storage battery 1.

The SOC estimator 23 estimates the present SOC (state of charge) of the storage battery 1 on the basis of the data measured by the measurer 22. The SOC may be estimated using an SOC-OCV curve calculated by the battery characteristic estimator 25 on the basis of the present state of the storage battery 1.

The storage 24 stores data to be used for a process according to the battery characteristic estimator 25. For example, the storage 24 stores a function showing the relationship between the charge amount and the potential of the positive electrode or the negative electrode of a unit cell. The storage 24 may store other data.

The battery characteristic estimator 25 calculates the present inner state parameters and the present battery characteristics of the storage battery 1 on the basis of the data measured by the measurer 22. The battery characteristics may not be calculated, if unneeded. As described above, the battery characteristics include a battery capacity, an internal resistance, an open circuit voltage (OCV), and an OCV curve. The OCV curve (a function) may be a function showing the relationship between the open circuit voltage (OCV) of the secondary battery and the charge state of the secondary battery or the quantity of electric charges charged in the secondary battery, for example. Alternatively, the OCV curve may be an SOC-OCV graph which illustrates the relationship between the SOC and the OCV, or may be a charge amount-OCV graph which illustrates the relationship between the charge amount and the OCV. The type of an OCV curve to be calculated may be defined in advance.

To calculate the battery characteristics, various types of a battery characteristics measurement method can be used. More specifically, the examples of the method include a charge or discharge experiment in which a battery capacity is actually measured by supplying current, a current pausing method in which an internal resistance value is mainly measured, and an electrochemical measurement such as an AC impedance measurement. Measurement may be performed by combination thereof. Alternatively, a method in which battery characteristics are simply estimated by analyzing a charge or discharge curve may be used.

The inner configuration of the battery characteristic estimator 25 is described.

The charge/discharge history recorder 251 records data (a history) of voltages, currents, and temperatures, or the like measured by the measurer 22 during charge or discharge of the storage battery 1. The recording is repeatedly performed at predetermined time intervals from start of charge of the storage battery 1 to completion of the charge of the storage battery 1. The time intervals may be freely set according to a process in which the record is to be used. For example, the time intervals may be set to approximately 0.1 to 1 second intervals. A time at which the recoding is performed may be an absolute time, or may be a relative time which is counted from start of charge. When the process performed by the charge/discharge history recorder 251 is repeated at the predetermined time intervals, recording of a time may be omitted.

Figure 3:
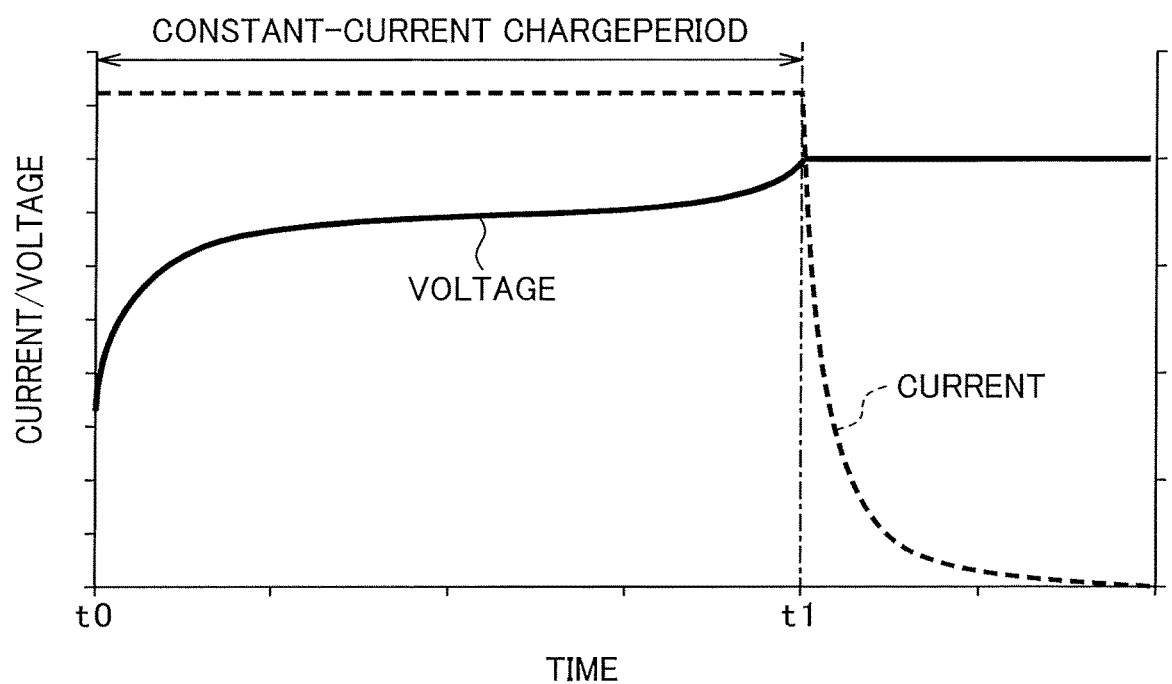
FIG. 3 illustrates an example of data regarding a current and a voltage during charge.

FIG. 3 illustrates an example of data regarding a current and a voltage during charge. The data illustrated in FIG. 3 is an example in constant-current constant-voltage charge, which is generally used as a charge method for secondary batteries. In FIG. 3, the broken line represents a current history and the solid line represents a voltage history.

In a process performed by the inner state parameter calculator 252, which is described later, the charge history of the whole constant-current constant-voltage charge may be used, or only the charge history of a constant-current charge period (t0 to t1 in FIG. 3) may be used, for example. Charge is not necessarily started when the SOC is 0%, and may be started when the SOC is 20%, for example.

The inner-state parameter calculator 252 calculates an amount of an active material forming the positive electrode or the negative electrode of a unit cell, an initial charge amount, the internal resistance of a unit cell, which are the inner state parameters, on the basis of the history recorded by the charge/discharge history recorder 251.

The inner-state parameter calculator 252 uses a function for calculating a storage battery voltage on the basis of an active material amount and an internal resistance. A storage battery voltage is calculated on the basis of the function, and current data and voltage data during charge or discharge of the storage battery. Then, an active material amount and an internal resistance which reduce a difference between a measured voltage and the calculated storage battery voltage are obtained through regression calculation. The positive electrode may be made from a plurality of active materials. However, in the present embodiment, an example of a secondary battery having a positive electrode and a negative electrode each made from one active material is explained.

When the secondary battery having a positive electrode and a negative electrode each made from one active material is charged, a voltage (a terminal voltage) "$V_t$" at time "t" is expressed by the following expression.

[Expression 1]

$$V_t = f_c\left(q_0^c + \frac{q_t}{M_c}\right) - f_a\left(q_0^a + \frac{q_t}{M_a}\right) + RI_t \quad (1)$$

"$I_t$" represents a current value at time "t", and "$q_t$" represents a charge amount of the storage battery at time "t". "$f_c$" represents a function showing the relationship between the charge amount and the potential of the positive electrode, and "$f_a$" represents a function showing the relationship between the charge amount and the potential of the negative electrode. "$q_o^c$" represents the initial charge amount of the positive electrode, and "$M_c$" represents the mass of the positive electrode. "$q_o^a$" represents the initial charge amount of the negative electrode, and "$M_a$" represents the mass of the negative electrode. "R" represents the internal resistance.

As the current value "$I_t$", the current data recorded by the charge/discharge history recorder 251 is used.

The charge amount $q_t$ is calculated by time-integrating the current value "$I_t$". The functions "$f_c$" and "$f_a$" are assumed to be stored as function information in the storage 24.

Five values (a parameter set), the initial charge amount "$q_o^c$" of the positive electrode, the mass "$M_c$" of the positive electrode, the initial charge amount "$q_o^a$" of the negative electrode, the mass "$M_a$" of the negative electrode, and the internal resistance "R" are estimated through regression calculation. The active material amount of each of the electrodes may be calculated by regarding the amount as a predetermined ratio of the mass of the electrode.

Figure 4:
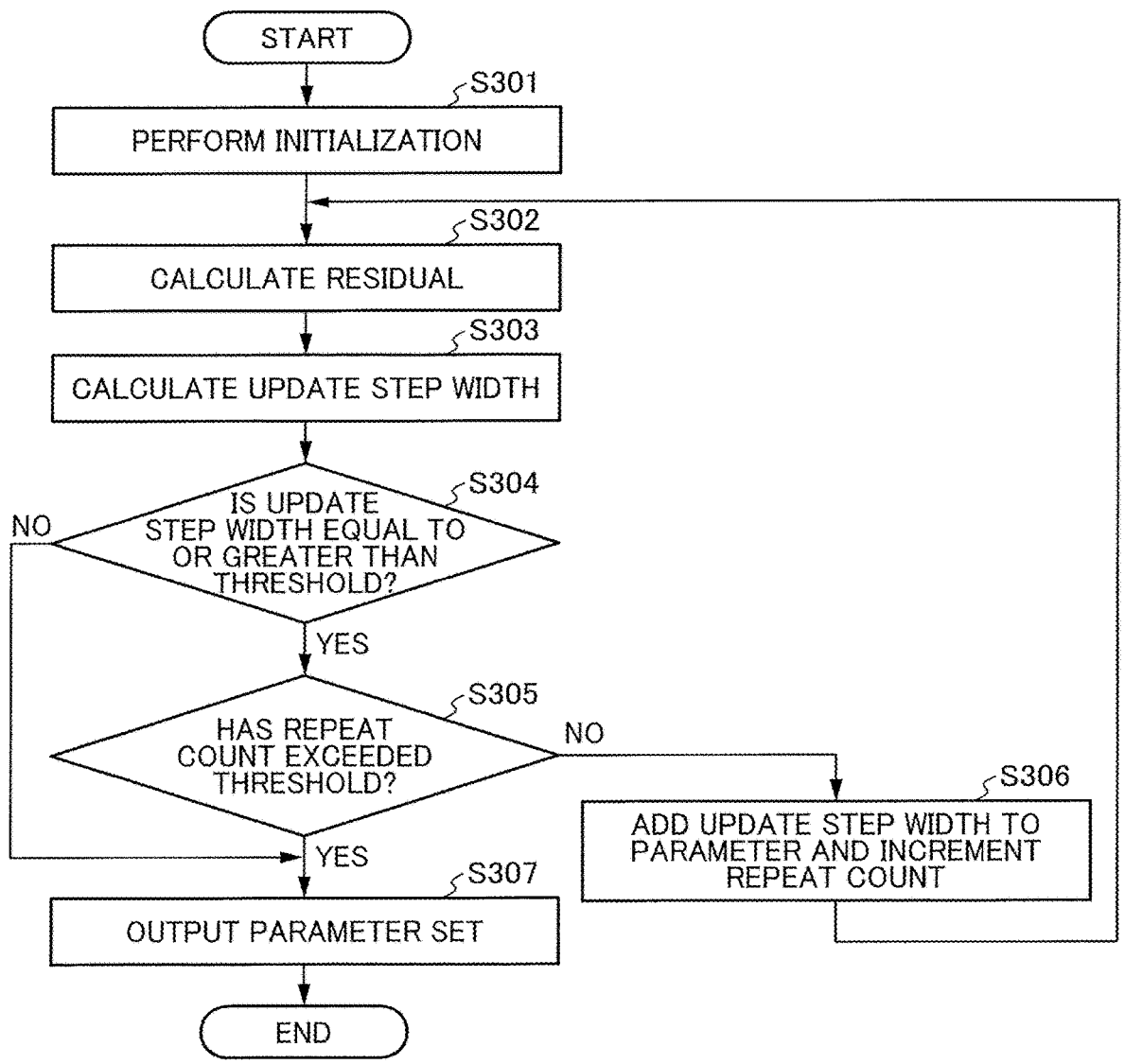
FIG. 4 illustrates an example of a flowchart of a process to be performed by an inner-state parameter calculator.

FIG. 4 illustrates an example of a flowchart of a process to be performed by the inner-state parameter calculator 252. The process to be performed by the inner-state parameter calculator 252 starts after completion of charge of the storage battery 1.

The inner-state parameter calculator 252 performs initialization to set initial values for the aforementioned parameter set and to set the repeat count of regression calculation to zero (S301). The initial value, for example, may be a value calculated when the previous process of calculating the active material amount, or may be an expectable value.

The inner-state parameter calculator 252 calculates a residual E which is expressed by the following expression (S302).

[Expression 2]

$$E = \sum_{t=0}^{t_{end}} (V_{bat\_t} - V_t)^2 \quad (2)$$

$$= \sum_{t=0}^{t_{end}} \left(V_{bat\_t} - \left(f_c\left(q_0^c + \frac{q_t}{M_c}\right) - f_a\left(q_0^a + \frac{q_t}{M_a}\right) + RI_t\right)\right)^2$$

wherein "$V_{bat\_t}$" represents the terminal voltage at time "t", and "$t_{end}$" represents a charge end time.

The inner-state parameter calculator 252 calculates an update step width of the parameter set (S303). The update step width of the parameter set can be calculated by method, such as a Gauss-Newton method, a Levenberg-marquardt method.

The inner-state parameter calculator 252 determines whether the update step width is less than a predetermined width (S304). When the update step width is less than the predetermined width (No at S304), the inner-state parameter calculator 252 determines that the calculation has converged, and outputs the present parameter set (S307). When the update step width is equal to or greater than a predetermined threshold (Yes at S304), whether the repeat count of regression calculation is greater than a predetermined value is checked (S305).

When the repeat count of regression calculation is greater than the predetermined value (Yes at S305), the present parameter set is outputted (S307). When the repeat count of regression calculation is equal to or less than the predetermined value (No at S305), the update step width calculated at S303 is added to the parameter set and the repeat count of regression calculation is incremented by one (S306). Subsequently, the process returns to calculation of the residual (S302). The flowchart illustrating the flow of the process to be performed by the inner-state parameter calculator 252 has been described above.

In the present embodiment, a charge history is used as an input to the inner-state parameter calculator 252. However, a discharge history may be used to similarly calculate an active material amount. Also in the case where a discharge history is used, the process flow to be performed by the inner-state parameter calculator 252 and parameters to be used may be same as those in the case where a charge history is used to calculate the active material amount.

The battery characteristic calculator 253 calculates an open circuit voltage which is a battery characteristic of the storage battery 1. Further, the battery characteristic calculator 253 calculates the relationship between the charge amount of the storage battery and the open circuit voltage by using the initial charge amount "$q_o^c$" of the positive electrode, the mass "$M_c$" of the positive electrode, the initial charge amount "$q_o^a$" of the negative electrode, and the mass "$M_a$" of the negative electrode calculated by the inner-state parameter calculator 252.

Figure 5:
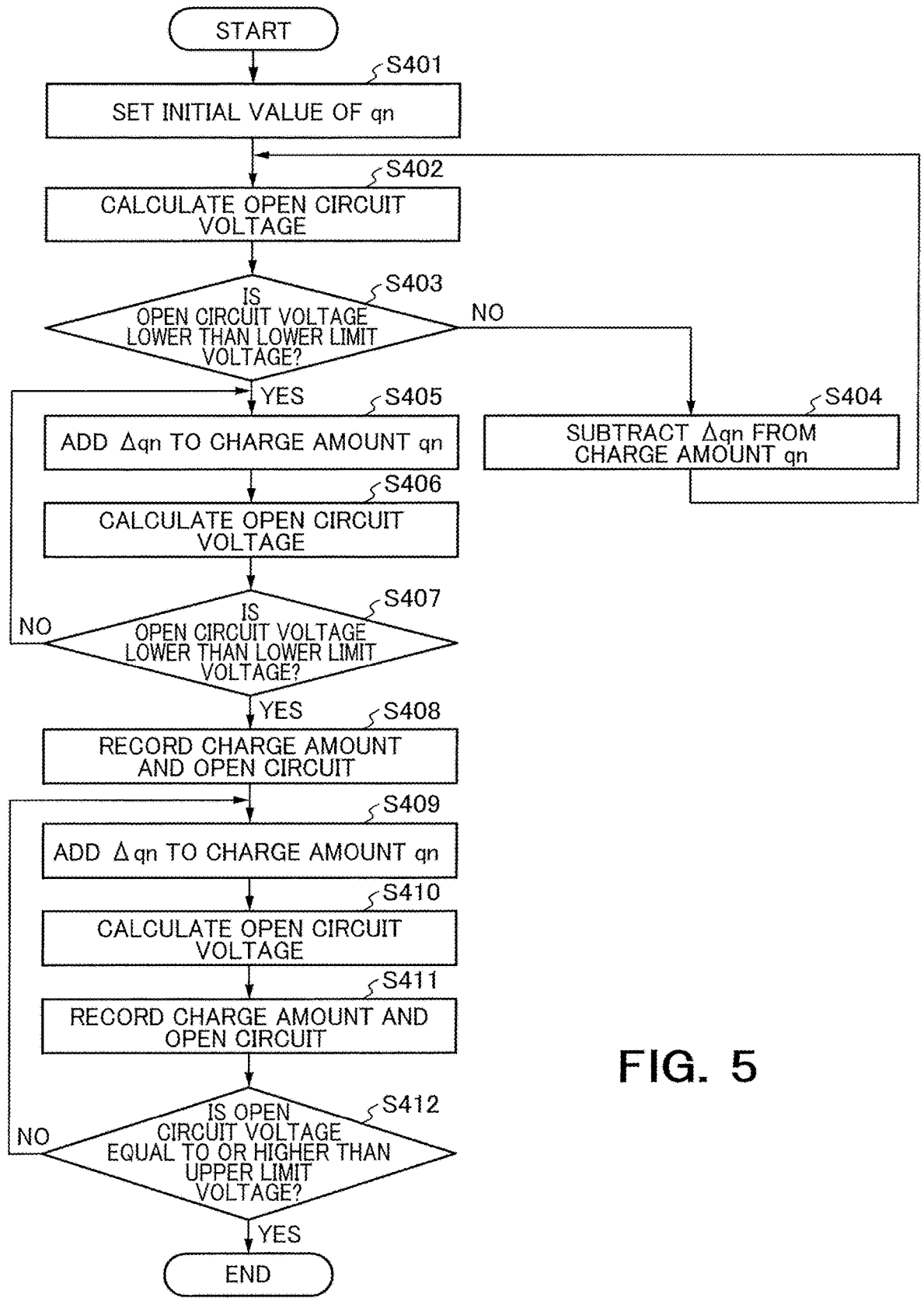
FIG. 5 illustrates an example of a flowchart of a process flow to be performed by a battery characteristic calculator.

FIG. 5 illustrates an example of a flowchart of a process flow to be performed by the battery characteristic calculator 253. The flowchart starts after the process performed by the inner-state parameter calculator 252 is ended. In this flowchart, the charge amount $q_n$ is increased and decreased by a predetermined value $\Delta q_n$, the charge amount $q_{n0}$ is found at which the open circuit voltage exceeds the lower limit, and $q_n$ is increased by $\Delta q_n$ from $q_{n0}$ as an initial value until the open circuit voltage exceeds the upper limit, and the charge amount and the open circuit voltage are recorded every time the increase is performed. Accordingly, the relationship between the charge amount and the open circuit voltage in a range from the lower limit to the upper limit of the open circuit voltage can be calculated. The difference between the charge amount $q_{n0}$ and the charge amount $q_n$ at which the open circuit voltage is the upper limit is a battery capacity.

The battery characteristic calculator 253 sets the initial value of the charge amount $q_n$ (S401). The initial value of $q_n$ may be set to zero or to a value which is less than zero by a few percent of the nominal capacity of the storage battery 1. Specifically, if the nominal capacity of the storage battery 1 is 1000 mAh, the initial value of $q_n$ may be set within a range of approximately −50 mAh to 0 mAh.

The battery characteristic calculator 253 calculates the open circuit voltage (S402). To calculate the open circuit voltage, the following expression can be used.

[Expression 3]

$$E_n = f_c\left(q_0^c + \frac{q_n}{M_c}\right) - f_a\left(q_0^a + \frac{q_n}{M_a}\right) \quad (3)$$

Next, the battery characteristic calculator 253 compares the calculated open circuit voltage with a predetermined storage battery lower limit voltage (S403). The storage battery lower limit voltage is defined on the basis of combination of the positive electrode active material and the negative electrode active material used in the storage battery 1. Specifically, in terms of each of the safety, the lifetime, the resistance, or the like, the appropriate usage ranges of the voltage for the positive electrode active material and the negative electrode active material are defined, and the combination of the ranges is used to determine the lower limit and the upper limit of the usage range for the storage battery.

When the open circuit voltage is not less than the predetermined lower limit voltage (No at S403), $\Delta q_n$ is subtracted from the charge amount $q_n$ (S404) and the open circuit voltage is calculated again (S402). When the open circuit voltage is less than the predetermined lower limit voltage (Yes at S403), the battery characteristic calculator 253 adds $\Delta q_n$ to the charge amount $q_n$ (S405). In this way, the charge amount $q_n$ approximates to the lower limit value. A value of $\Delta q_n$ can be freely determined. For example, $\Delta q_n$ may be set to approximately 1/1000 to 1/100 of the nominal capacity of the storage battery 1. Specifically, if the nominal capacity of the storage battery 1 is 1000 mAh, $\Delta q_n$ may be set to a range of approximately 1 mAh to 10 mAh.

The battery characteristic calculator 253 calculates the open circuit voltage by using the added charge amount $q_n+\Delta q_n$ (S406). Subsequently, the battery characteristic calculator 253 compares the calculated open circuit voltage with the aforementioned lower limit voltage (S407). When the open circuit voltage is lower than the lower limit voltage (No at S407), the process returns to S405 and $\Delta q_n$ is added to the charge amount $q_n$ again (S405). When the open circuit voltage is equal to or higher than the lower limit voltage (Yes at S407), the charge amount $q_n$ at that time is set to $q_{n0}$ because the open circuit voltage has exceeded the lower limit value, and the charge amount $q_{n0}$ and the open circuit voltage En are recorded together (S408). The value of the charge amount $q_{n0}$ may be set as a reference value and expressed by "0". In this case, the value obtained by subtracting the value of $q_{n0}$ from the value of the charge amount $q_n$, in subsequent recording.

The battery characteristic calculator 253 adds $\Delta q_n$ to the charge amount $q_n$ (S409), calculates the open circuit voltage (S410), and records the calculated open circuit voltage En and the value obtained by subtracting $q_n$ from the charge amount $q_n$ (S411).

The battery characteristic calculator 253 compares the calculated open circuit voltage with the predetermined upper limit voltage of the storage battery (S412). The upper limit voltage of the storage battery is defined on the basis of combination of the positive electrode active material and the negative electrode active material used in the storage battery 1. When the open circuit voltage is lower than the predetermined upper limit voltage (No at S412), the process returns to adding of $\Delta q_n$ to the charge amount again (S409). When the open circuit voltage is equal to or higher than the predetermined upper limit voltage (Yes at S412), the process is ended. The flowchart illustrating the process flow to be performed by the battery characteristic calculator 253 has been described.

Figure 6A:
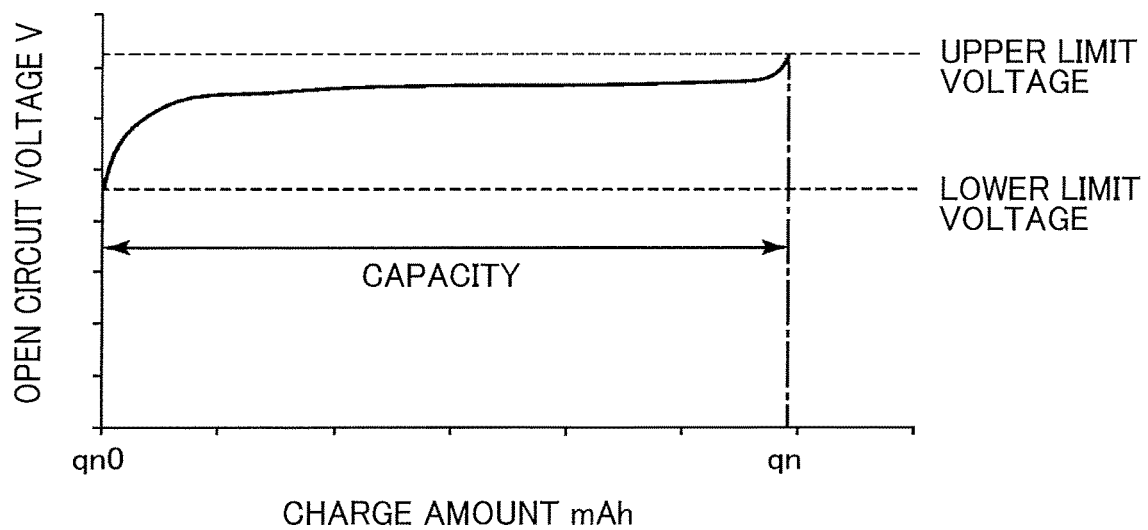
FIGS. 6A and 6B illustrate an example of graphs (charge amount-OCV curves) illustrating the relationships between a charge amount and an open circuit voltage.
Figure 6B:
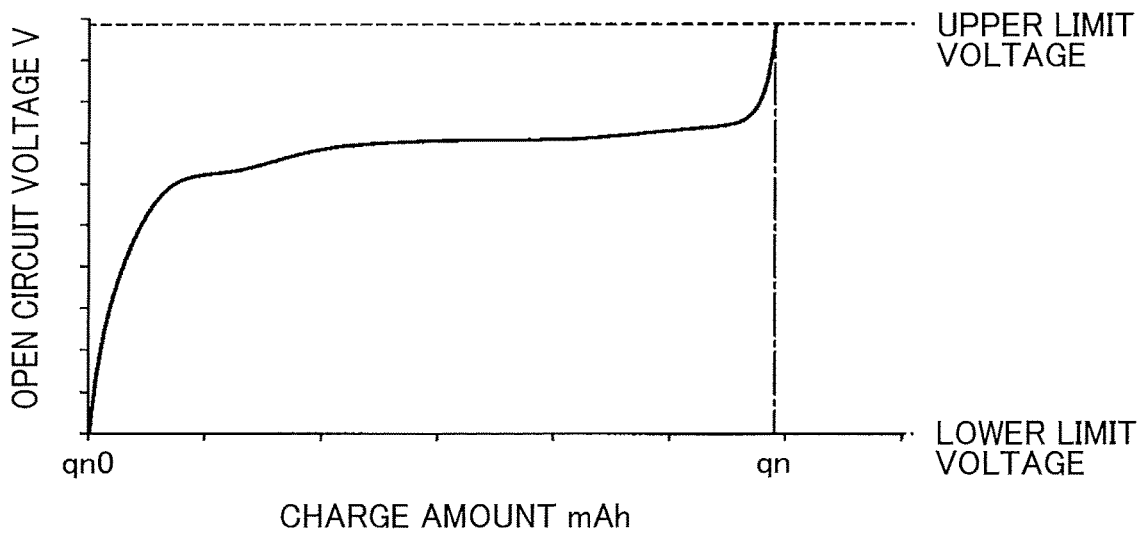

FIGS. 6A and 6B illustrate an example of graphs (charge amount-OCV curves) illustrating the relationships between a charge amount and an open circuit voltage. FIG. 6A illustrates a charge amount-OCV curve at the present state obtained by the battery characteristic calculator 253. FIG. 6B is a diagram obtained by taking out a range from the lower limit voltage to the upper limit voltage of the ordinate, from the graph illustrated in FIG. 6A.

Figure 7:
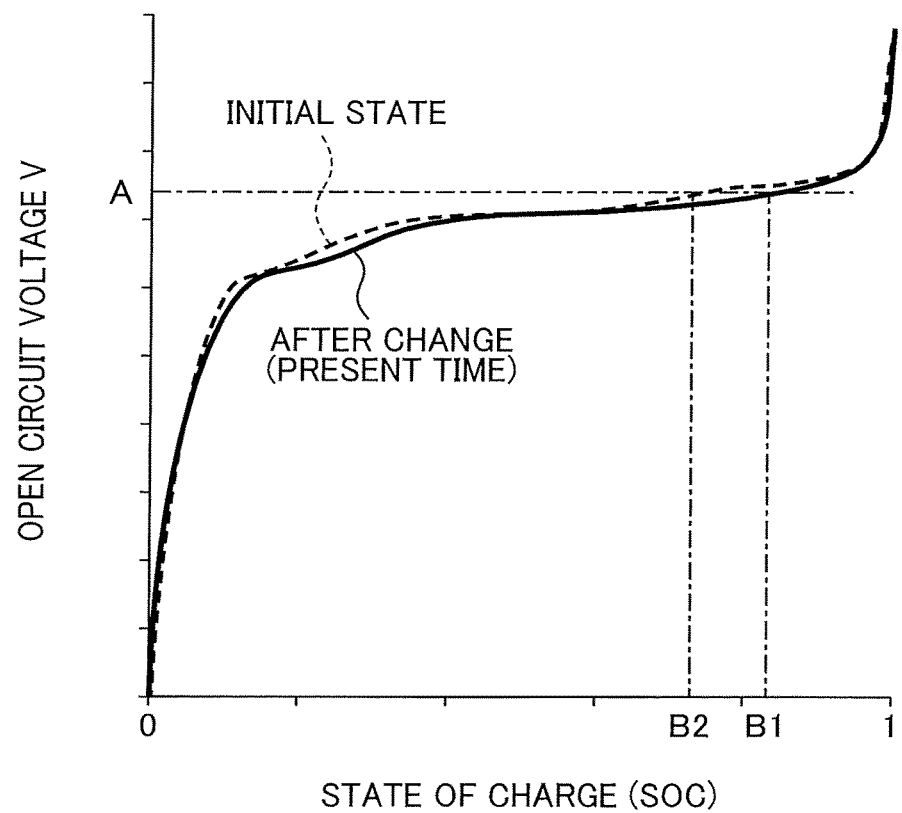
FIG. 7 illustrates an example of a graph (an SOC-OCV curve) illustrating the relationship between an SOC and an open circuit voltage.

FIG. 7 illustrates an example of a graph (an SOC-OCV curve) illustrating the relationship between an SOC and an open circuit voltage. FIG. 7 differs from FIGS. 6A and 6B in that the abscissa in FIG. 7 indicates not the charge amount but the SOC. In FIG. 7, a graph (a solid line) obtained by converting the graph illustrated in FIG. 6B into a SOC-OCV curve and the SOC-OCV curve (a broken line) of the storage battery at the initial state are overlapped. In FIG. 7, the broken line represents the open circuit voltage of the storage battery at the initial state, and the solid line represents the open circuit voltage of the storage battery after change (present time) due to deterioration of the storage battery or the like. The SOC indicates the ratio of the present charge amount with respect to the full charge capacity, and is expressed by a value from 0 to 1, or 0 to 100%.

The charge amount may be converted into an SOC by using the battery capacity and the charge amount calculated from the charge amount-OCV curve. In the description herein, the simple term "charge state" includes not only the SOC but also the charge amount and the like.

The length of the curve after change becomes shorter as the capacity decreases. However, FIG. 7 illustrates that not only the length but also the shape of the curve changes. For example, in the case where the state of charge (SOC) is estimated on the basis of the open circuit voltage, when the measured open circuit voltage is A, the normal charge state (the present state of charge) is B1. However, if the curve of the open circuit voltage is considered not to change, that is, if the open circuit voltage is to be obtained from the SOC-OCV curve at the initial state, B2 is obtained as the charge state at the voltage A, and thus, efficiency in estimation of the charge state is deteriorated. Therefore, as a result of using the SOC-OCV curve at the present state, as in the first embodiment, the charge state can be measured with high accuracy.

The SOC-OCV curve calculated by the battery characteristic estimator 25 may be acquired by the SOC estimator 23 such that the SOC estimator 23 estimates the SOC of the storage battery 1 on the basis of the SOC-OCV curve.

Therefore, according to the first embodiment, it is possible to accurately grasp the relationship (the charge amount-OCV curve or the SOC-OCV curve) which changes with use between the charge amount and the open circuit voltage, without performing special charge and discharge, and thus, the charge state can be highly accurately estimated.

The case where the positive electrode and the negative electrode of the secondary battery are each formed from one kind of an active material has been described herein. However, the present invention can be similarly applied to a secondary battery in which any of the positive electrode and the negative electrode thereof is formed from a plurality of kinds of active materials. Further, in the case where a different storage for storing the active material amounts of the storage battery 1 is prepared in advance, the battery characteristic calculator 253 can calculate a graph showing the relationship between the charge amount and the open circuit voltage of the secondary battery within a predetermined voltage range of the storage battery, by using the active material amounts stored in the different storage.

The battery characteristic calculator 253 may further calculate other battery characteristics. For example, the battery characteristic calculator 253 may calculate the voltage, the power, and the power amount of the storage battery 1 by using the calculated open circuit voltage or the like. As the calculation method, for example, calculation expressions below may be used. In the following calculation expressions, "c" represents a predetermined constant.

voltage=open circuit voltage−$c$×internal resistance×current  (Voltage)

power=current×open circuit voltage−$c$×internal resistance×(current)$^2$  (Power)

power amount=battery capacity×average voltage  (Power amount)

As the internal resistance, an estimated value calculated by the inner-state parameter calculator 252 may be used, or an estimated value corrected by the internal-resistance corrector 26 may be used. The internal-resistance corrector 26 will be described later. The battery characteristic calculator 253 may recalculate a battery characteristic, which has been calculated, by using the estimation value corrected by the internal-resistance corrector 26. The estimation value corrected by the internal-resistance corrector 26 can further improve the accuracy. The current may be acquired from data measured by the measurer 22. The battery characteristic calculator 253 may receive an expression, a constant value, or the like necessary for the calculation, via the storage 24 or the like.

The internal-resistance corrector 26 corrects, on the basis of a temperature T measured by the measurer 22, the internal resistance R calculated by the battery characteristic estimator 25 to the internal resistance of the storage battery 1 at the present temperature T. The corrected internal resistance is defined as Rcr. In a case where the internal resistance is not corrected, the internal-resistance corrector 26 can be omitted.

Temperature correction of the internal resistance is performed by the internal resistance corrector 26, will be described.

The temperature correction of the internal resistance provides, for example, means to correct the influence of temperature from a result of a battery characteristics diagnosis method, and to expand a temperature range where the battery characteristics diagnosis method can be preferably applied, a battery characteristics diagnosis method in which the battery capacity, the internal resistance, and the degree of degradation of each of the active materials of each of the positive and negative electrodes are estimated from the charge and discharge curve by reference to the charge amount—OCV data of each of the active materials.

The principle and method of the temperature correction are described. Lithium-ion secondary batteries each include a positive electrode and a negative electrode opposite to each other, and an electrolyte containing a Li salt between the positive and negative electrodes. Active materials are applied onto current collecting foils of the positive and negative electrodes. The current collecting foils are connected to the positive electrode and negative electrode terminals on the storage battery exterior. During charge and discharge of the storage battery, Li ions move between the positive electrode active material and the negative electrode active material via the electrolyte so that electrons flow from the active materials to external terminals.

Each of the active materials has a unique potential and a unique amount of Li which can be reversibly inserted or desorbed. An energy quantity which the storage battery can store in a range of a fixed charge and discharge voltage is determined by the amounts of the positive electrode active material and the negative electrode active material in the storage battery and combination thereof.

Further, at the time of charge and discharge, there are caused Li ion conduction, charge transfer resistance due to Li ions in the electrolyte penetrating into the active material, resistance of a film formed on the interface between the electrolyte and the active material, and electrical resistance due to electrons flowing through the active material and the current collection foil. The internal resistance of the battery is the sum total of the Li ion transfer resistance, the electron transfer resistance, the charge transfer resistance, the film resistance, and the diffused resistor in the positive electrode and the negative electrode.

Generally, in a storage battery control system in a lithium ion secondary battery, the voltage of each of the unit cells, the temperature in the battery pack, and the like, are measured in the viewpoint of safety. If the battery characteristics can be calculated on the basis of such measurement data, cost and time required for calculation can be suppressed.

However, it is very difficult to analyze the behavior of the storage battery during actual use in which a charge and discharge condition finely and randomly varies. The reason for this is that since such a behavior is a phenomenon in which a resistance depending on time, a diffusion resistance, a relaxation process, and the like are complexed in a complicated way, a calculation model therefor is difficult to obtain. In contrast, for example, if only a simply behavior such as charge of an electric vehicle under a predetermined condition is analyzed, the analysis can be performed using a simplified model.

Therefore, in the storage battery performance estimating method according to the present embodiment, values of variables are determined by fitting calculation using, as variables, the amount of each of the active materials, the rise (overvoltage) of the storage battery voltage due to internal resistance at application of charge current, on the basis of an "electric potential −charge amount" curve associated with the Li insertion-elimination reaction of each active material, which is obtained by data (charge-discharge curve) of charge or discharge under fixed conditions. Thereby, it is possible to estimate the capacity reduction (reduction of each active material) and the increase in internal resistance.

Figure 8:
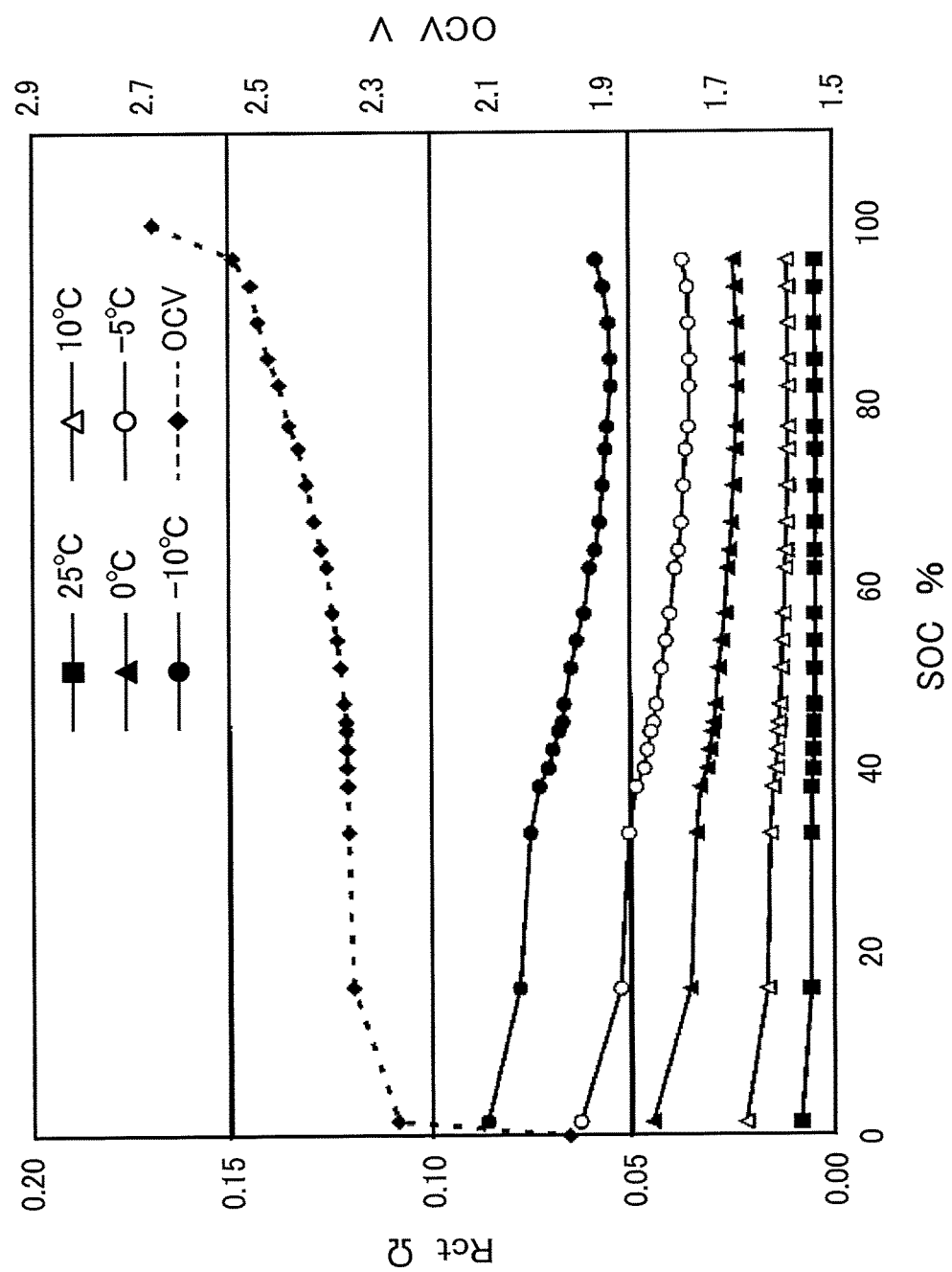
FIG. 8 illustrates an example of the relationships, at respective temperatures, between SOCs and reaction resistances Rct.

However, under an actual use situation of a storage battery, a temperature condition varies according to an external environment, the state of the storage battery during charge and the like. When the temperature of the storage battery changes, the performance of the storage battery changes. In particular, the internal resistance increases greatly depending on reduction in temperature. FIG. 8 illustrates an example of the relationships, at respective temperatures, between SOCs and reaction resistances Rct. A reaction resistance Rct is one of internal resistance components. As illustrated in FIG. 8, reaction resistances differ greatly according to difference in temperature. Accordingly, even if the analysis results of measurement data of different temperatures are compared with one another, it is difficult to evaluate the increase in internal resistance due to deterioration because the results are greatly influenced by variation in analysis result caused by temperatures.

Accordingly, when the battery characteristics are estimated on the basis of measurement data about the storage battery actually being used, performing temperature correction on the internal resistance improves accuracy of estimating the battery characteristics.

Internal resistances of the storage battery are composed of a plurality of types of resistance components. The resistance components differ from one another in temperature dependency and increase speed due to deterioration. For this reason, with progress of deterioration, the ratio of the resistance changes, and accordingly, the temperature dependency of the internal resistance as a whole also changes. In view of this point, in temperature correction of internal resistances in the storage battery performance estimating method according to the present embodiment, internal resistances are divided into three components, which are a reaction resistance "Rct", a diffusion resistance "Rd", and an ohmic resistance "Rohm". The components are corrected to values corresponding to a reference temperature "T0", in accordance with the respective unique temperature dependencies, and then, are summed up.

Specifically, the storage battery temperature at the time of measurement is corrected to the reference temperature by mathematical expressions below. In the expressions below, "Rgas" represents a gas constant, "T0" represents the reference temperature, T represents the storage battery temperature at the time of measurement, "R1" represents a constant, and "Ea", "Eb", and "Ec" each represent a constant for determining the temperature dependency of the corresponding resistance component.

$Rct(T0)=Rct(T) \times Exp(-Ea/(Rgas \cdot T))/Exp(-Ea/(Rgas \cdot T0))$ (Reaction resistance)

$Rd(T0)=Rd(T) \times Exp(-Eb/(Rgas \cdot T))/Exp(-Eb/(Rgas \cdot T0))$ (Diffusion resistance)

$Rohm(T0)=(Rohm(T)-R1) \times Exp(-Ec/(Rgas \cdot T))/Exp(-Ec/(Rgas \cdot T0))+R1$ (Ohmic resistance)

Figure 9:
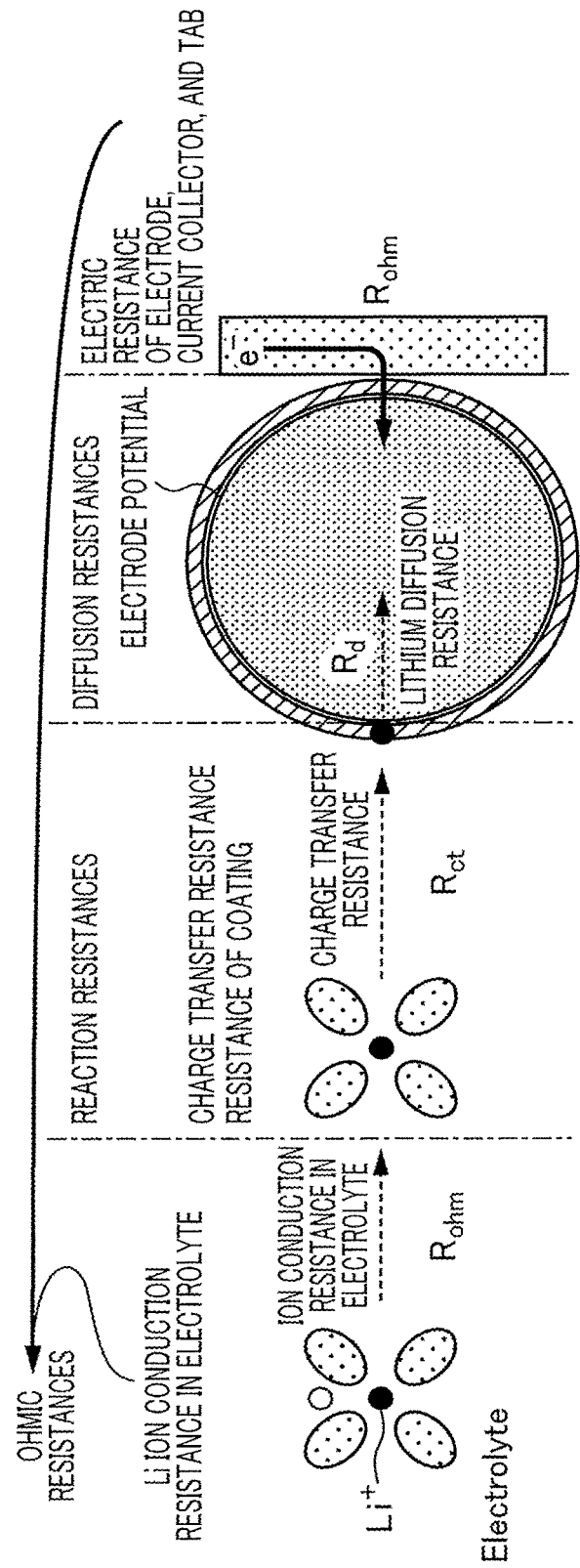
FIG. 9 is a diagram regarding resistive components.

FIG. 9 is a diagram regarding the resistance components. The ohmic resistances include an ion conduction resistance in an electrolyte and an electron conduction resistance in the storage battery. The electron conduction resistance which has a low temperature dependency is a constant. The reaction resistances include a charge transfer resistance and the resistance of a surface coating. The diffusion resistances include resistances associated with diffusion of lithium ions inside the active materials and the electrodes.

"Ec" of the ohmic resistance represents an active energy associated with transfer of Li ions in the electrolyte. "Ea" of the reaction resistance represents an energy generated when Li ions solvated in the electrolyte are removed on an active material surface. "Eb" of the diffusion resistance is considered as an active energy associated with transfer of Li ions between sites in an active material. Accordingly, the above values can be considered as constant values which are not changed in the deterioration process.

The values "Ea", "Eb", and "Ec" can be calculated by measuring the AC impedances, or the current pulses of unit cells, for example. The values "Ea", "Eb", and "Ec" about the storage battery to be analyzed are calculated from measurement values, and stored in the storage 24, in advance. The values may be referred in temperature correction calculation of the internal resistances.

A method of estimating the battery characteristics from the charge and discharge curve by dividing the internal resistances into three types of components is described.

In the deterioration process of the storage battery, all of the three components of the internal resistances increase, but the increase speeds due to the deterioration differ from one another. Accordingly, the assumption that deterioration does not occur may be established as a result of limiting the lifetime range of the storage battery to be evaluated. For example, in a storage battery for electric vehicles for which the evaluation lower limit is assumed to be the residual capacity of approximately 90 to 70%, some of the resistance components can be approximated to a fixed value throughout the storage battery lifetime, although the use condition, the configuration of the storage battery, and the like can have some influences.

(First Method)

In a first method for calculating the three components from the calculated internal resistance values of the storage battery, the ohmic resistance component and the diffusion resistance component are considered to be fixed, and the residual is considered as the reaction resistance. This method assumes that deterioration does not cause increase in the ohmic resistance component and the diffusion resistance component, and considers only temperature change which depends on a cell temperature. In analysis of a charge and discharge curve, the ohmic resistance component and the diffusion resistance component at the temperature T are subtracted from the internal resistance value estimated for the temperature T, and the remainder is regarded as the reaction resistance component. The components are subjected to temperature correction to the reference temperature T0, and summed up, so that the internal resistance values at the reference temperature T0 are calculated. The first method is suitable for moderate usage, in which, for example, the SOC falls within a range in which the active materials of the positive and negative electrodes are stable, the temperature is equal to or lower than the approximate room temperature, and the current of the storage battery is relatively small.

(Second Method)

In a second method, the ohmic resistance component and the diffusion resistance component are estimated by a function regarding the relationship between the two resistance components and an accumulated time or accumulated power amount, and the residual is regarded as the reaction resistance. This method calculates the ohmic resistance component and the diffusion resistance component, while assuming that deterioration in the ohmic resistance component and the diffusion resistance component correlates with a time or a cycle amount of charge and discharge. In analysis of a charge and discharge curve, the calculated ohmic resistance component and the calculated diffusion resistance component are subtracted from the internal resistance value estimated for the certain temperature T, and the remainder is regarded as the reaction resistance component. The components are subjected to temperature correction to the reference temperature T0, and summed up, so that the internal resistance values at the reference temperature T0 are calculated. The second method is suitable for a case where deterioration in the ohmic resistance component and the diffusion resistance component is relatively small, but actually progresses.

Which of an accumulated time and an accumulated power amount is used may be determined according to the use environment or the like. For example, for a case where deterioration of the storage battery progresses due to generation of gas during preservation, deterioration amount estimation using an accumulated time is suitable. In contrast, for a case where deterioration of the storage battery, such as change in volume of the active materials, is remarkable due to repetition of a process cycle such as charge and discharge, deterioration amount estimation using an accumulated power amount is suitable.

Data on an accumulated time or an accumulated power amount is assumed to be held in advance. The accumulated power amount may be replaced with an operation amount of a device, such as the travel distance of a vehicle, for example.

(Third Method)

In a third method, a reaction resistance component and a diffusion resistance component are estimated from data on the diffusion resistances and the charge amounts of the respective materials which are held in advance or data on the reaction resistances and the charge amounts of the respective materials which are held in advance, and the residual is regarded as an ohmic resistance component. In the third method, unlike the first and second methods, the values of the reaction resistance and the diffusion resistance are estimated by performing regression calculation, in analysis of the charge and discharge curve, with reference to the reaction resistance-charge amount curve of an active material, the diffusion resistance-charge amount curve of an active material, or the internal resistance-charge amount curve of the storage battery. By using the fact that the resistance component of an active material has a dependency on the charge amount, that is, the SOC, and that the tendency of the dependency does not change even after deterioration, the compositions of the internal resistance are estimated from the tendency of internal resistance-charge amount of the storage battery.

A reaction resistance-charge amount curve and a diffusion resistance-charge amount curve of an active material need to be measured in advance. The form of change due to deterioration, which depends on the configuration of the storage battery, needs to be measured in advance. For example, it is considered that, when a resistive surface film is formed, the resistance is uniformly increased by a constant value according to the formation of the film, and that, when the active material is decreased, the resistance is uniformly increased by n-times according to the decrease.

The third method is suitable for a case where the reaction resistance-charge amount remarkably changes, and as a result, the reaction resistances of the storage battery clearly have a dependency on the charge amount.

(Fourth Method)

In a fourth method, regression calculation is performed using data of each active material which is held in advance and is on the diffusion resistance-charge amount, the reaction resistance-charge amount, and the ohmic resistance-charge amount, so that the reaction resistance component, the ohmic resistance component, and the diffusion resistance component are estimated. In the third method, only the diffusion resistance-charge amount and the reaction resistance-charge amount are used. However, in the fourth method, data on the ohmic resistance-charge amount is further used. The fourth method is effective for a case where the dependency of an active material on the ohmic resistance-charge amount is characteristic, for example, a case where the electron conductivity of the active material greatly changes due to charge or discharge.

The battery characteristic calculator 253 may calculate, as the battery characteristics, the power amount or the like which can be actually outputted by using the corrected internal resistances. The power amount which can be actually outputted can be calculated on the basis of the charge amount-OCV curve, the dischargeable power amount, and the corrected internal resistances.

The charge pattern creator 27 calculates a charge pattern on the basis of a specified value of the speed of deterioration and the estimation value of inner state parameters or battery characteristics estimated by the battery characteristic estimator 25. The value of the charge current in the charge pattern is calculated such that the speed of deterioration caused by charge is less than a specified value.

The speed of deterioration represents a speed at which deterioration of the secondary battery progresses. The specified value of the speed of deterioration may be stored in the deterioration information storage 271 in advance, or may be received from a user or the like via an input device (not illustrated).

The deterioration information storage 271 stores therein information (data) regarding deterioration of the secondary battery, which is required for the charge control apparatus 2 to calculate a charge pattern for the storage battery 1. Hereinafter, such information is referred to as deterioration information. Deterioration information can be regarded as reference data for a graph or a function to be referred in calculation of a charge pattern. Deterioration information includes at least a deterioration model or a deterioration map for distinction from the storage battery 1.

The deterioration information storage 271 may store information other than deterioration information. For example, the deterioration information storage 271 may store a constraint condition to be used in a process performed by the charge pattern creator 27. The deterioration information storage 271 may store a created charge pattern. The deterioration information storage 271 may be identical to the storage 24.

First, a deterioration model is described. FIG. 10A to 10D are graphs each illustrating a deterioration model. FIG. 10A to 10D each illustrate an example of a deterioration speed calculation graph for calculating a deterioration speed. A deterioration speed calculation graph illustrates the relationship between parameters about the secondary battery and the deterioration speed. Hereinafter, the parameters about the secondary battery are referred to as reference parameters.

A deterioration model shows how deterioration of a secondary battery progresses, and, for example, refers to a whole deterioration speed calculation graph. A deterioration speed calculation graph is calculated on the basis of the result of an inspection of a secondary battery. The present embodiment assumes that a deterioration speed calculation graph is calculated in advance, and is stored in the deterioration information storage 271.

A deterioration speed calculation graph is derived from the inspection result of a plurality of secondary batteries satisfying a certain prerequisite condition. The prerequisite condition is not limited to a particular condition, and various prerequisite conditions are assumed. For example, the prerequisite condition requires the active material amount in the positive electrode of a unit cell to fall within a predetermined range. A plurality of secondary batteries satisfying the prerequisite condition are inspected, and a deterioration speed calculation graph is calculated on the basis of the inspection result. At that time, the inner state parameters are estimated from the inspection result, and a deterioration model of the positive electrode and a deterioration model of the negative electrode can be obtained on the basis of change in the active material amount of the positive electrode and change in the active material amount of the negative electrode, respectively. When the active material amount in the positive electrode of the storage battery 1 falls within the predetermined range, that is, when the storage battery 1 satisfies the prerequisite condition, the deterioration speed of the storage battery 1 can be predicted from the deterioration speed calculation graph calculated on the basis of the prerequisite condition. A method for creating the deterioration speed calculation graph is not limited to a particular method, and may be freely determined.

Other than the above, for example, a matter regarding a preservation or use environment of a secondary battery may be regarded as a prerequisite condition. As a prerequisite condition regarding the environment, the temperature, the humidity, or the like may be used. For example, also a matter regarding the use history of a secondary battery may be used as a prerequisite condition. As a prerequisite condition regarding the use history, the number of performing charge and discharge, the total use time, or the like may be used.

As the causes of deterioration of a secondary battery, the reactivity with an electrolyte, a damage due to expansion or contraction of an active material or the like may be expected. However, specifying the cause of deterioration of a secondary battery is difficult. The deterioration condition varies according to the storage condition, the use history, or the like of a secondary battery. Therefore, deterioration speed calculation graphs for various prerequisite conditions and reference parameters are calculated in advance, and a deterioration speed calculation graph matching the state of the storage battery 1 is used. That is, a deterioration speed calculation graph calculated on the basis of the inspection result of a secondary battery the state of which is substantially same as the state of the storage battery 1 is used. Accordingly, the deterioration speed of the storage battery 1 can be accurately predicted.

Since various inspections are performed, various reference parameters are assumed. The reference parameters may include one indicating the state of a secondary battery, such as the SOC, the C-rate (charge/discharge current value), and the potential in the active material of the positive electrode or the negative electrode, for example. An environment-related matter such as the temperature and the humidity or a matter related to the use history of a secondary battery may be used as a reference parameter. In addition, the prerequisite condition may be considered as a constant reference parameter.

Figure 10A:
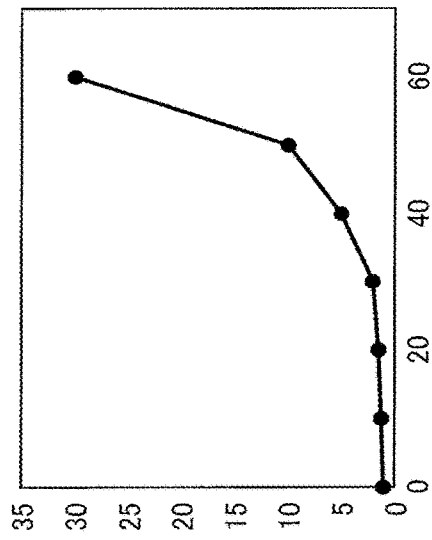
FIG. 10A to 10D are graphs each illustrating a deterioration model.

FIG. 10A is an (SOC-deterioration speed) graph illustrating the relationship between the SOC and the deterioration speed of the positive electrode in a secondary battery which satisfies a certain prerequisite condition. The abscissa represents the SOC and the ordinate represents the relative deterioration speed of the positive electrode. The relative deterioration speed represents a relative value when the lowest deterioration speed is "1". Hereinafter, the deterioration speed refers to a relative value, unless otherwise noted. FIG. 10A illustrates that, in a secondary battery which satisfies a certain prerequisite condition, when the SOC is 20 to 60%, the deterioration speed of the positive electrode is low, and when the SOC is less than 20% or greater than 60%, the deterioration speed of the positive electrode is high.

Figure 10C:
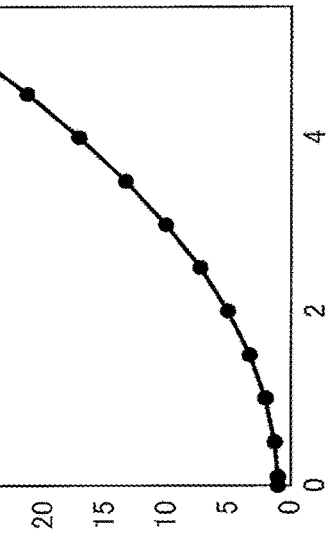
Figure 10B:
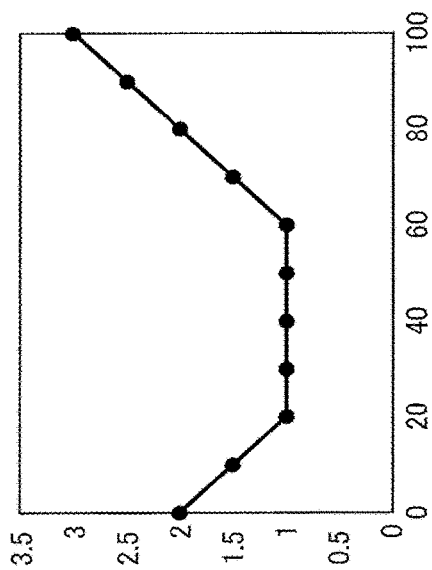

FIG. 10B is a graph illustrating the relationship between the SOC and the deterioration speed of the negative electrode in a secondary battery which satisfies a certain prerequisite condition. Unlike the graph in FIG. 10A, also in the range where the SOC is less than 20%, the deterioration speed of the negative electrode is low. In this way, the deterioration speeds of the positive electrode and the negative electrode are not necessarily same even when the reference parameters are same.

Figure 10D:
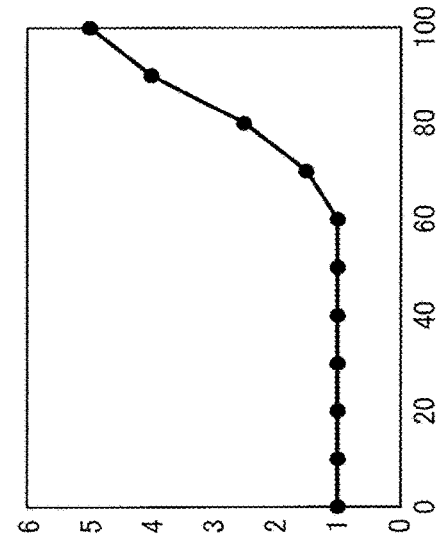

FIG. 10C is a graph illustrating the relationship between the temperature and the deterioration speed of a secondary battery. The dependency of the deterioration speed on the temperature during use or preservation is illustrated. FIG. 10D is a graph illustrating the relationship between the C-rate and the deterioration speed of a secondary battery. The dependency of the deterioration speed on the C-rate is illustrated.

Instead of the deterioration speed calculation graph, a function for calculating a deterioration speed may be used. For example, the approximation function of the deterioration speed calculation graph may be used.

Figure 11A:
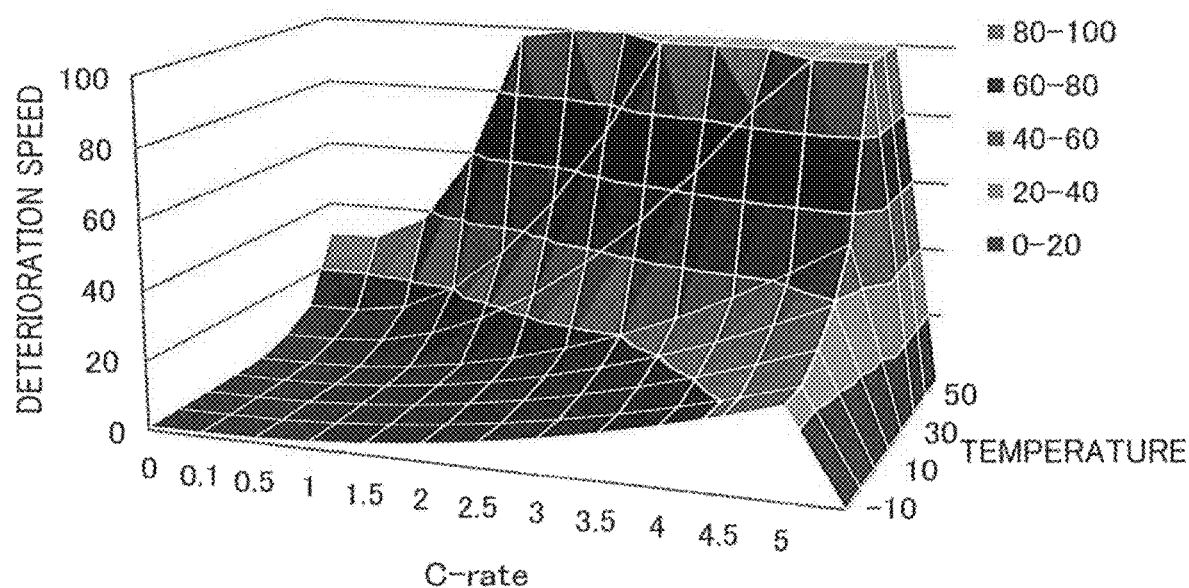
FIGS. 11A and 11B are graphs each illustrating a deterioration map.
Figure 11B:
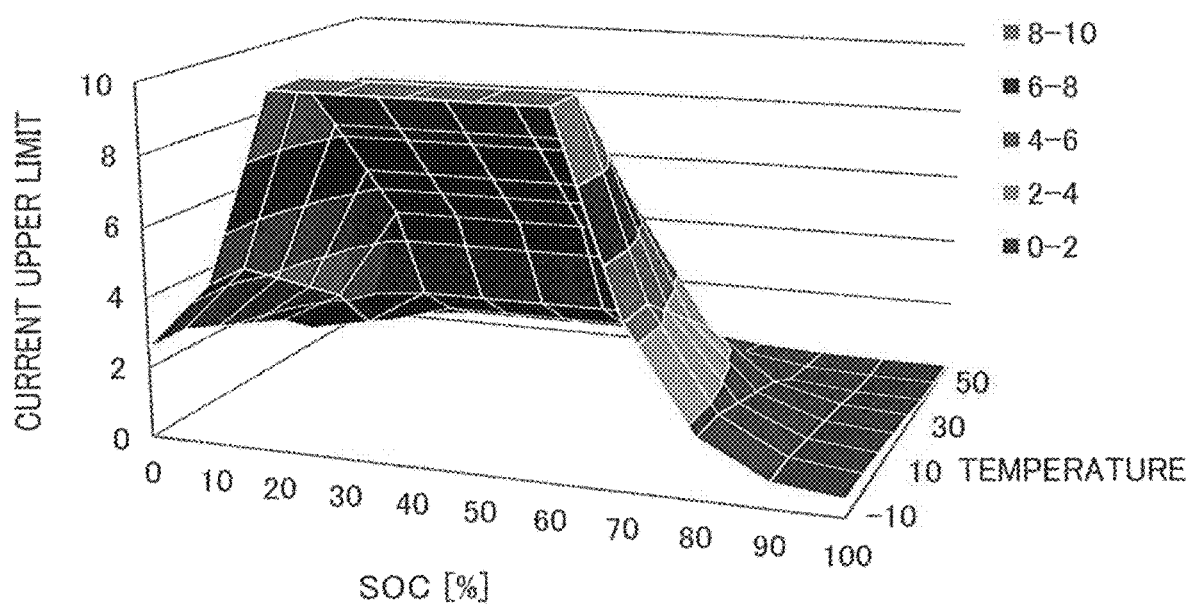

Next, a deterioration map is described. FIGS. 11A and 11B are graphs each illustrating a deterioration map. The deterioration map is a multidimensional graph composed of a plurality of elements, and is an aggregate of deterioration speed calculation graphs of deterioration models. For example, the deterioration map is obtained by quantitatively mapping the deterioration speeds with respect to the temperature, the SOC, and the charge current value. Similarly to the deterioration model, the deterioration map may exist for each of the positive electrode and the negative electrode. The deterioration map of a secondary battery can be created from the deterioration map of the positive electrode and the deterioration map of the negative electrode.

FIG. 11A is a three-dimensional graph indicating the relationship among three reference parameters which are the temperature, the C-rate, and the deterioration speed, when the SOC is a certain value. The deterioration map in FIG. 11A exists for each value of the SOC. The cross-section graph (a two-dimensional graph) of FIG. 11A taken along a plane orthogonal to the axis of the temperature is a deterioration speed calculation graph with the SOC and the temperature as the prerequisite condition and the C-rate as a reference parameter. The cross-section graph of FIG. 11A taken along a plane orthogonal to the axis of the C-rate is a deterioration speed calculation graph with the SOC and the C-rate as the prerequisite condition and the C-rate as a reference parameter. In this way, a prerequisite condition is one of the reference parameters.

FIG. 11B is a three-dimensional graph indicating the relationship among three reference parameters which are the SOC, the temperature, and the upper limit of charge current for a secondary battery. The upper limit of charge current is referred to as "current upper limit" (first upper limit). When a temperature and an allowable deterioration speed are specified, FIG. 11B is created by calculating a value of a C-rate for each value of the SOC using FIG. 11A for each value of the SOC.

For example, the graph in FIG. 11A is assumed to be a graph for a case where the SOC is 40%. It is assumed that the temperature of −10° C. and the allowable deterioration speed of 20 or lower are specified as a prerequisite condition. FIG. 11A illustrates that the maximum value of the C-rate is 4 C. "1 C-rate" is equal to a current value for discharging (charging), in one hour, a secondary battery having been charged (discharged) up to the battery capacity limit. If the battery capacity of the secondary battery is 2500 mAh, the current upper limit is 10 A because the maximum value of the C-rate is 4 C. A point at the SOC of 40%, the temperature of −10° C., and the upper current limit of 10 A are plotted, and thereby FIG. 11B is obtained.

FIG. 11A differs from FIG. 11B in that the reference parameter is the C-rate in FIG. 11A whereas the reference parameter is the SOC in FIG. 11B. Thus, conversion between the C-rate and the SOC is performed. However, a reference parameter in FIG. 11A can be same as that in FIG. 11B. Furthermore, for convenience of explanation, the two deterioration maps in FIG. 11A and FIG. 11B are used. Alternatively, a deterioration map obtained by combining FIG. 11A and FIG. 11B may be used.

As described above, a deterioration model and a deterioration map each include data on relationship among the deterioration speed of a secondary battery, one or more reference parameters such as an SOC and a C-rate, and the current upper limit.

The charge pattern creator 27 may generate a deterioration map on the basis of a deterioration model, or may generate a deterioration model on the basis of a deterioration map.

The deterioration information acquirer 272 acquires, from the battery characteristic estimator 25, an estimation value according to at least any of the inner state parameters and the battery characteristics. On the acquired estimation value, the deterioration information acquirer 272 acquires deterioration information (first reference data) corresponding to the storage battery 1 from the deterioration information storage 271. The deterioration information acquirer 272 may acquire deterioration information (second reference data) corresponding to the positive electrode on the basis of an estimation value according to the positive electrode, and acquire deterioration information (third reference data) corresponding to the negative electrode on the basis of an estimation value according to the negative electrode.

For example, deterioration information may be acquired on the basis of an initial charge amount of the positive electrode or negative electrode calculated as an inner state parameter. For example, deterioration information may be acquired on the basis of the mass of the positive electrode or the negative electrode calculated as an inner state parameter. For example, deterioration information may be acquired on the basis of an open circuit voltage calculated as a battery characteristic.

When the estimation value of the storage battery 1 satisfies the prerequisite condition of a secondary battery for creating in advance deterioration information, the deterioration information is considered to correspond to the storage battery 1. For example, in the case where deterioration information has been created on the basis of a plurality of secondary batteries which each satisfy a prerequisite condition requiring the active material amount in the positive electrode to fall within a predetermined range, when the estimation value of the active material amount in the positive electrode of the storage battery 1 falls within the predetermined range, the deterioration information is considered to correspond to the storage battery 1. In addition, deterioration information corresponding to the storage battery 1 is regarded as deterioration information suited to create a charge pattern of the storage battery 1.

The deterioration information acquirer 272 may acquire deterioration information on the basis of a plurality of estimation values. The accuracy of the upper current limit in the case where deterioration information matching the plurality of estimation values is used is considered to be improved more than that in the case where deterioration information matching one estimation value is used.

The upper-limit data calculator 273 calculates the current upper limit of the storage battery 1, considering deterioration progress, on the basis of the deterioration information determined to correspond to the storage battery 1 and a specified value of the deterioration speed. Here, the current upper limit for obtaining a deterioration speed equal to or lower than the specified value is calculated.

Figure 12A:
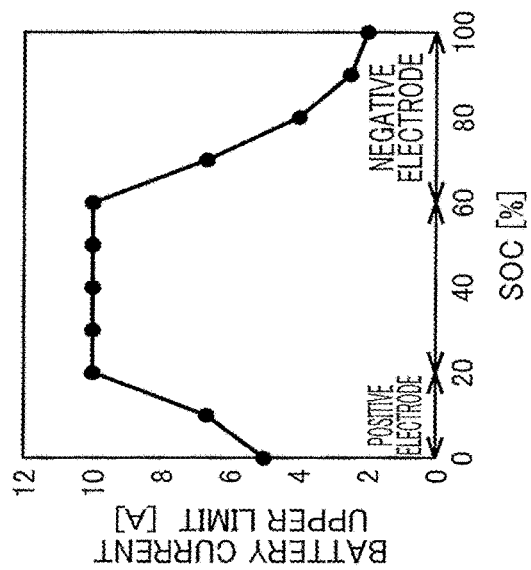
FIG. 12A to 12D are graphs regarding calculation of the upper limit of a charge current.
Figure 12C:
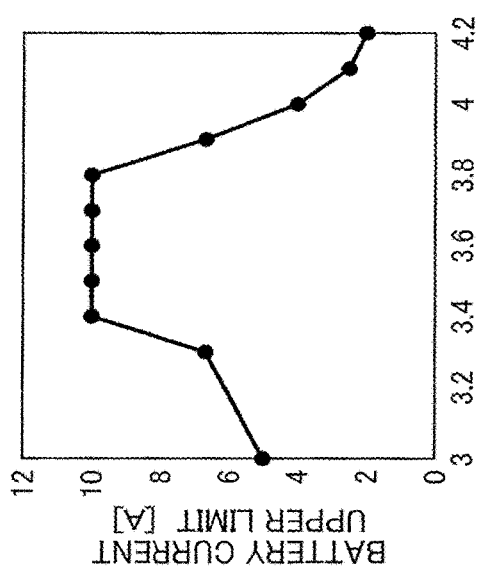
Figure 12B:
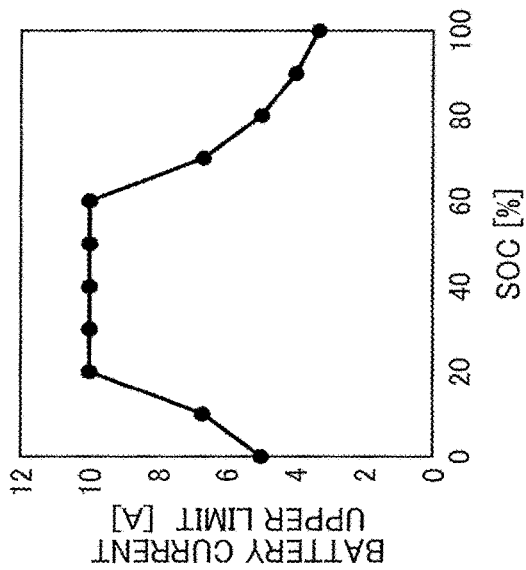

FIG. 12A to 12D are graphs regarding calculation of the upper limit of charge current. The graph in FIG. 12A illustrates the relationship between the SOC of the storage battery 1 and the current upper limit in the positive electrode of the storage battery 1, in the case where deterioration progress is considered. The graph in FIG. 12B illustrates the relationship between the SOC of the storage battery 1 and the current upper limit in the negative electrode of the storage battery 1, in the case where deterioration progress is considered. In this way, the upper-limit data calculator 273 calculates data on a graph or a function for showing the relationship between the reference parameters and the current upper limit. The data on the relationship is referred to as "upper limit data".

For both the positive electrode and the negative electrode, the upper-limit data calculator 273 may calculate upper limit data indicating the relationship between the reference parameters and the current upper limits of charge current in the both electrodes, as illustrated in FIGS. 12A and 12B. For example, FIG. 11B is a deterioration map of the positive electrode of a secondary battery, assuming a case where the temperature is −10° C. as the prerequisite condition. In this case, the graph at −10° C. in FIG. 11B is illustrated in FIG. 12A.

FIG. 12C is a diagram illustrating the current upper limit of the storage battery 1. From comparison with FIG. 12A and FIG. 12B, the current upper limits of the positive electrode and the negative electrode may differ from each other in a case where deterioration progress is considered. In this case, the current upper limit (a first upper limit) is determined on the basis of the current upper limit (a second upper limit) in the positive electrode and the current upper limit (third upper limit) in the negative electrode. In a case where the current upper limit of one electrode is high but the current upper limit of the other electrode is low, when the higher current upper limit is adopted as the current upper limit, the deterioration speed of the other electrode is increased. Accordingly, the current upper limit preferably depends on the smaller one of the current upper limit of the positive electrode and the current upper limit of the negative electrode. Accordingly, a charge pattern considering deterioration of both the positive electrode and the negative electrode can be calculated.

For example, in FIG. 12A to 12D, in the range in which the SOC is 0 to 20%, the upper current limit of the positive electrode is lower than the upper current limit of the negative electrode. Thus, in the range in which the SOC is 0 to 20%, the upper current limit of the storage battery 1 matches the upper current value of the positive electrode. In the range in which the SOC is 70 to 100%, the upper current value of the positive electrode is higher than the upper current value of the negative electrode. Thus, in the range in which the SOC is 70 to 100%, the upper current limit of the storage battery 1 matches the upper current value of the negative electrode.

In FIG. 12C, the upper current limit matches the smaller one of the current upper limit of the positive electrode and the current upper limit of the negative electrode. However, the current upper limit may be smaller than the smaller one of the current upper limit of the positive electrode and the current upper limit of the negative electrode.

Figure 12D:
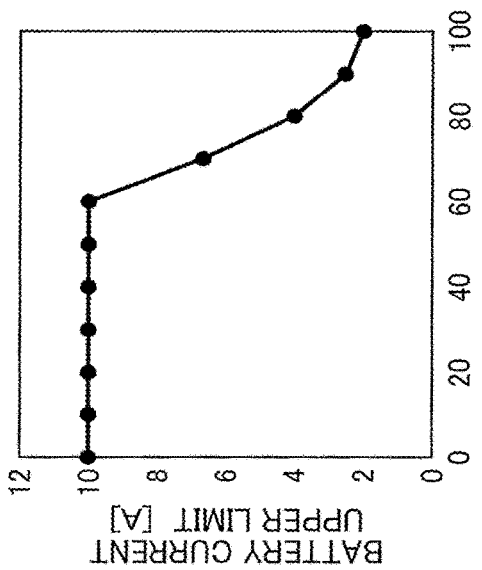

FIG. 12D illustrates data on the upper limit data using the voltage as a reference parameter. When charge is performed, the voltage of the storage battery 1 increases. In FIG. 12D, a range in which the voltage is approximately 3 to 3.3 V corresponds to a range in which the SOC is 0 to 20%. A range in which the voltage is approximately 3.3 to 3.8 V corresponds to a range in which the SOC is 20 to 60%. A range in which the voltage is approximately 3.8 to 4.2 V corresponds to a range in which the SOC is 60 to 100%. In conversion of the SOC to the voltage, the SOC-OCV curve calculated by the battery characteristic estimator 25 and the above expression for voltage calculation may be used. In this way, various reference parameters may be used as parameters for upper limit data.

It has been described that, in the examples in FIG. 12A to 12D, the upper limit data of the voltage of the storage battery 1 is calculated on the basis of the upper limit data of the SOC. That is, it has been assumed that FIG. 12D is created from FIG. 12C. However, the upper limit data of the voltage of the storage battery 1 may be calculated by converting the upper limit data of the SOC of the positive electrode into the upper limit data of the voltage of the positive electrode, converting the upper limit data of the SOC of the negative electrode into the upper limit data of the voltage of the negative electrode, and integrating the upper limit data of the voltage of the positive electrode and the upper limit data of the voltage of the negative electrode.

The current upper limit may be made further smaller, considering a predetermined charge constrain condition. The charge constrain condition is the input standard of the storage battery 1, the output standard of the charge control apparatus 2 or the like, for example.

In this way, the upper-limit data calculator 273 calculates the upper limit of charge current for obtaining the deterioration speed equal to or less than a specified value, and calculates upper limit data indicating the relationship between the calculated upper limit and a certain reference parameter.

Figure 13A:
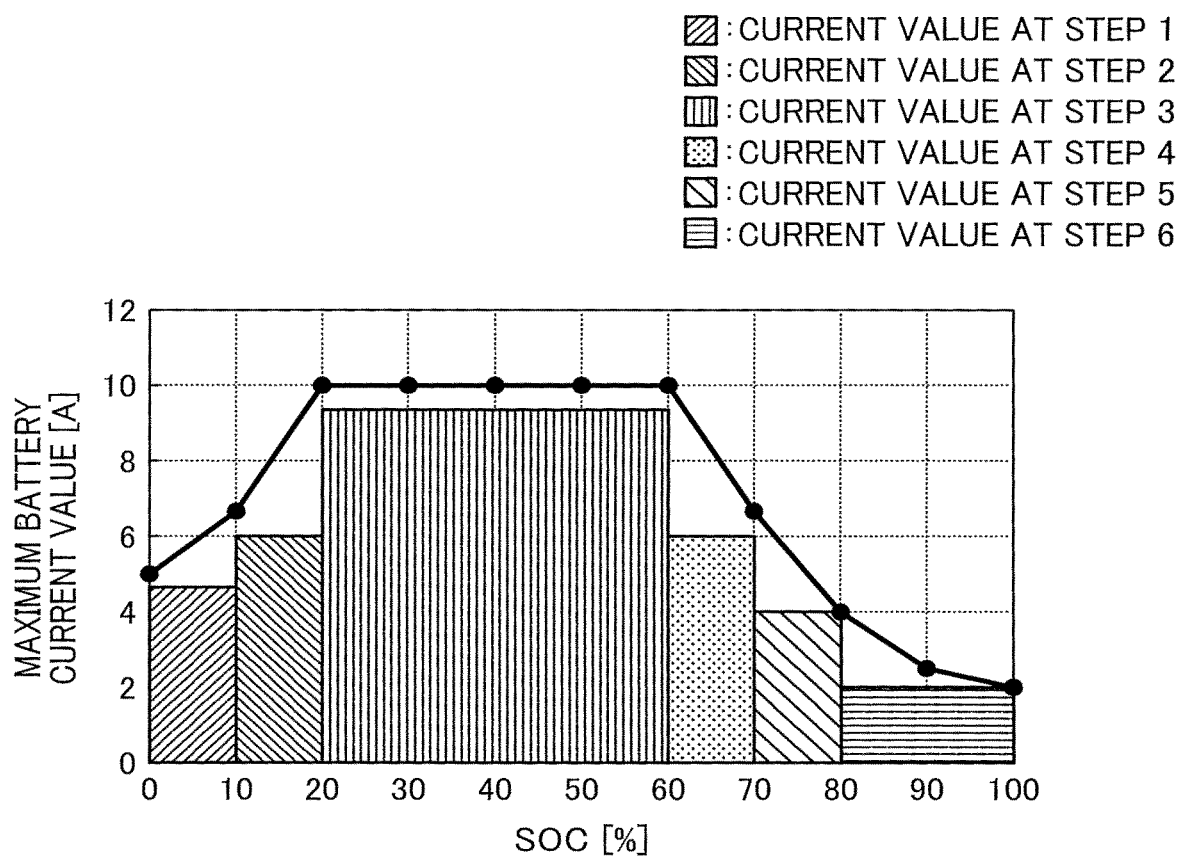
FIGS. 13A and 13B are graphs regarding calculation of a charge pattern.
Figure 13B:
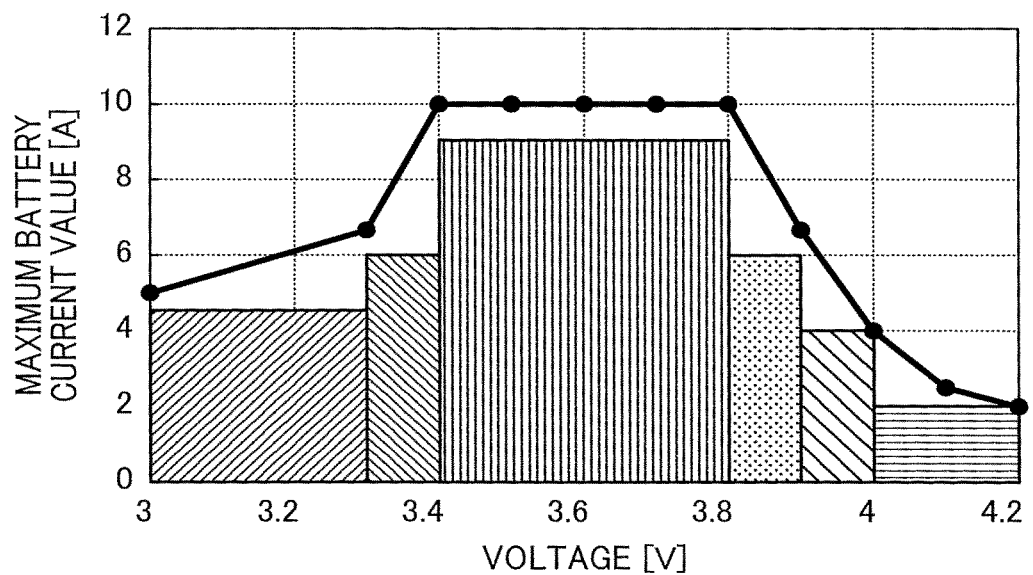

The charge pattern calculator 274 calculates a charge pattern on the basis of the upper limit data calculated by the upper-limit data calculator 273. A charge pattern is data indicating the relationship between reference parameters and the value of charge current (current value) in a period during which the storage battery 1 is charged. FIGS. 13A and 13B are graphs regarding calculation of a charge pattern. The bar graphs in FIGS. 13A and 13B each indicate the relationship between reference parameters and the value of charge current. A set of the FIGS. 13A and 13B is regarded as a charge pattern. As illustrated in FIGS. 13A and 13B, the current value is determined so as not to exceed the upper current limit.

Here, since a charge pattern in a constant-current charge section is assumed, the current value is made constant in a plurality of sections in the charge period. The current value may be freely defined as long as the current value is equal to or less than the upper limit. The minimum value of the current upper limit in a plurality of sections may be regarded as the value of charge current in the sections. A calculation method for a current value may differ among a plurality of sections. When a condition does not require a constant current, a constant current does not need to be used. For example, the current value of a charge pattern may be set to a value less than the current upper limit by several percent.

In FIGS. 13A and 13B, a plurality of sections in the charge period are set for respective changes in the upper limit of the upper limit data. That is, a charge pattern calculated is divided into a plurality of sections having the different upper limits of the deterioration speed, and the values of charge current in the corresponding sections are determined. Therefore, when the value of current charge is set largest within an allowable range, the storage battery 1 can be quickly charged while being suppressed from deteriorating. Furthermore, even if a complicated inspection for grasping the inner state of the storage battery 1 is not performed, the inner state of the storage battery 1 can be grasped on the basis of measurement data on the voltage and the current of the storage battery 1, so that the current value of the charge pattern is further likely to fall within an allowable deterioration speed range.

The current value of a charge pattern is assumed to be constant in each section. However, the current value in a charge pattern may be specified in a range having upper and lower limits defined. For example, the current value of a charge pattern may be specified in a range of a few several % from the upper current limit calculated in past. Accordingly, the charge/discharge controller 21 can adjust the current value within the range, considering the state or the like of the storage battery 1, measured by the measurer 22 during charge.

As illustrated in FIG. 13B, a charge pattern based on a voltage value may also be created on the basis of the upper limit data based on the voltage value. When a charge pattern in which voltage which can be easily measured during charge is used as a reference parameter is calculated, as in FIG. 13B, charge can be performed so as to be linked with the measurement result of voltage by the measurer 22.

When a charge pattern based on a voltage value is calculated, an electronic device can charge a storage battery in accordance with the charge pattern as long as the electronic device can measure the voltage of the storage battery, even if the electronic device cannot measure inner state parameters. Accordingly, a function for directly measuring inner state parameters is not required, cost for manufacturing the electronic device can be reduced.

In calculating a charge pattern, a charge pattern satisfying a predetermined charge constrain condition may be created by considering the condition. For example, when the storage battery 1 is charged in accordance with a charge pattern calculated in past, charge may not be completed within a predetermined time. In this case, the charge pattern may be changed according to which a priority is given to deterioration progress or a charge time. When a priority is given to a charge time, for example, a charge pattern may be calculated for current exceeding the current upper limit is supplied to any of the sections. A section to which current exceeding the current upper limit is supplied may be determined by performing comparison with the total deterioration speed or the like in the charge pattern.

Figure 14:
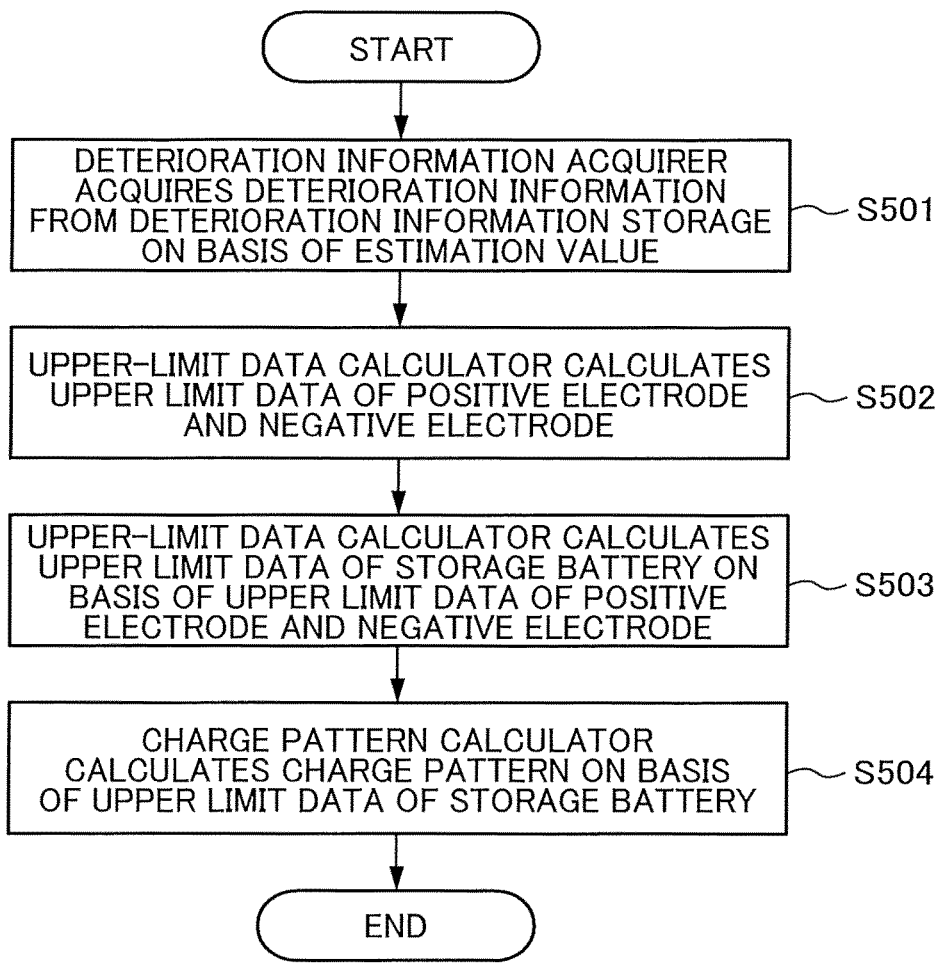
FIG. 14 illustrates an example of a flowchart of a charge pattern calculation process.

FIG. 14 illustrates an example of a flowchart of a charge pattern calculation process. The charge pattern calculation process may be performed after calculation of the battery characteristics or the like of the storage battery 1 by the battery characteristic estimator 25 or the internal-resistance corrector 26 and before charge of the storage battery 1.

The deterioration information acquirer 272 acquires deterioration information corresponding to the storage battery 1 from the deterioration information storage 271, on the basis of the estimation values of inner state parameters or battery characteristics acquired from the battery characteristic estimator 25 or the internal-resistance corrector 26 (S501).

In the case where the deterioration information storage 271 is realized by a database or the like and the battery characteristics or the like are recorded as attribution corresponding to deterioration information, the deterioration information can be extracted on the basis of the estimation value of the battery characteristics or the like by using a management function such as a RDBMS. When the estimation value does not completely match the value of the battery characteristic or the like corresponding to deterioration information but the difference therebetween is within an allowable range, the deterioration information may be extracted.

The upper-limit data calculator 273 calculates the upper limit data indicating the relationship between reference parameters and the current upper limit in each of the positive electrode and the negative electrode, on the basis of deterioration information acquired by the deterioration information acquirer 272 (S502). The upper-limit data calculator 273 integrates the upper limit data of the positive electrode and the upper limit data of the negative electrode, and calculates the upper limit data of the storage battery 1 (S503). The charge pattern calculator 274 calculates a charge pattern on the basis of the upper limit data about the storage battery 1 calculated by the upper-limit data calculator 273 (S504). The flowchart of the charge pattern calculation process has been described above. The calculated charge pattern may be transmitted to the deterioration information storage 271, the storage 24, or the charge/discharge controller 21.

A calculated charge pattern may be recreated when the state of the storage battery 1 is determined to have changed. Change of the state of the storage battery 1 may be determined by the battery characteristic estimator 25 or the charge pattern creator 27. Alternatively, the state of the storage battery 1 may be outputted through an output device (not illustrated) such that a user of the storage battery 1, a manager of the charge control apparatus 2, or the like, who has viewed the output, gives an instruction to update the charge pattern through an input device (not illustrated).

Whether the state of the storage battery 1 has changed or not may be determined on a reference value for update, which is determined in advance. For example, it may be determined that the state of the storage battery 1 has changed when the battery capacity becomes lower than the reference value, when the internal resistance becomes higher than the reference value, or when a change amount of an inner state parameter is greater than the reference value. The reference value may be freely determined.

Figure 15:
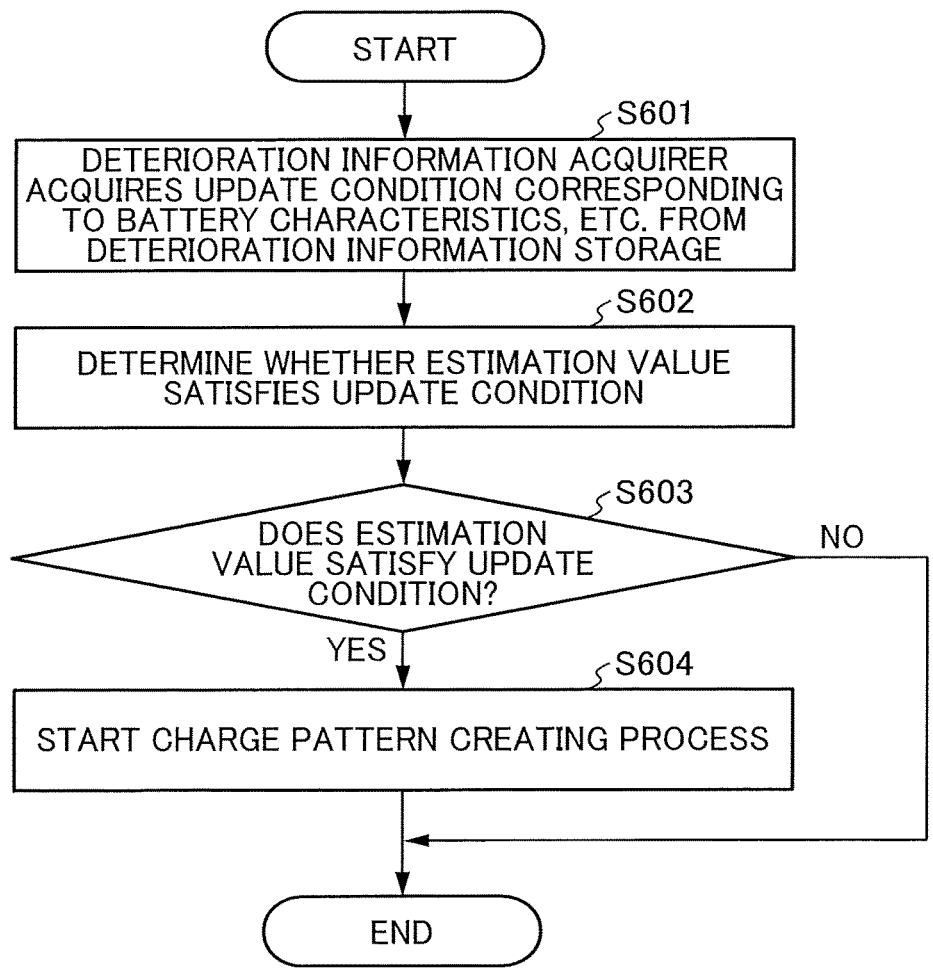
FIG. 15 illustrates an example of a flowchart of a charge pattern update process.

FIG. 15 illustrates an example of a flowchart of a charge-pattern update process. Here, update is assumed to be determined by the charge pattern creator 27. The deterioration information acquirer 272 acquires the estimation value of a battery characteristic or the like from the battery characteristic estimator 25 or the internal-resistance corrector 26, and acquires an update condition corresponding to the acquired battery characteristic from the deterioration information storage 271 (S601). The update condition is assumed to be stored in the deterioration information storage 271 in advance. The deterioration information acquirer 272 determines whether the acquired battery characteristic or the like satisfies the update condition (S602).

When the battery characteristic or the like does not satisfy the update condition (No at S603), the update process is ended.

When the battery characteristics or the like satisfies the update condition (Yes at S603), a charge pattern creating process is started (S604).

For a plurality of the estimation values, the deterioration information acquirer 272 may determine to perform update when at least one of the battery characteristics or the like satisfies the update condition. Alternatively, the deterioration information acquirer 272 may determine to perform update when a predetermined number or more, or all of the battery characteristics or the like satisfy the update condition. Whether the estimation value satisfies the update condition may be determined by a component other than the deterioration information acquirer 272.

It has been assumed in the above description that update of a charge pattern is performed when the estimation value of the battery characteristic or the like estimated by the battery characteristic estimator 25 or the like satisfies the update condition. However, due to load on the charge control apparatus 2 or the like, an estimation process of a battery characteristic or the like may not frequently be performed. In this case, the charge pattern calculator 274 may determine whether the update condition is satisfied or not, on the basis of the prediction value of a battery characteristic or the like. Accordingly, even when the interval of an inspection of the storage battery 1 is made longer, failing to update a charge pattern is prevented. The prediction value of a battery characteristic or the like may be calculated by the charge pattern calculator 274 on the basis of deterioration information. Alternatively, the prediction value may be calculated on the basis of not deterioration information but a predetermined prediction expression.

As described above, according to the first embodiment, the inner state parameters and the battery characteristics of the storage battery 1 can be estimated on the basis of the voltage and the current of the secondary battery. Furthermore, a charge pattern which provides the speed of deterioration due to charge equal to or less than a specified value can be created on the basis of the value transition of the inner state parameters or the battery characteristics. Even when the storage battery 1 is quickly charged, charge based on the charge pattern can suppress deterioration of the storage battery 1 within an allowable range.

Second Embodiment

In the first embodiment, the deterioration information acquirer 272 acquires deterioration information corresponding to the storage battery 1 from deterioration information stored in the deterioration information storage 271. However, due to the wide variation of the state of the storage battery 1, if all kinds of deterioration information are stored in the deterioration information storage 271, the capacity of the deterioration information storage 271 becomes large. There is a possibility that deterioration information corresponding to the storage battery 1 is not found in the deterioration information storage 271. Therefore, in the second embodiment, deterioration information is acquired and updated from outside. Accordingly, an amount of deterioration information stored in the deterioration information storage 271 can be reduced, so that downsizing of the charge pattern creator 27 and reduction in cost for manufacturing the charge pattern creator 27 can be achieved. Furthermore, the number of kinds of the supported storage battery 1 can be increased.

Figure 16:
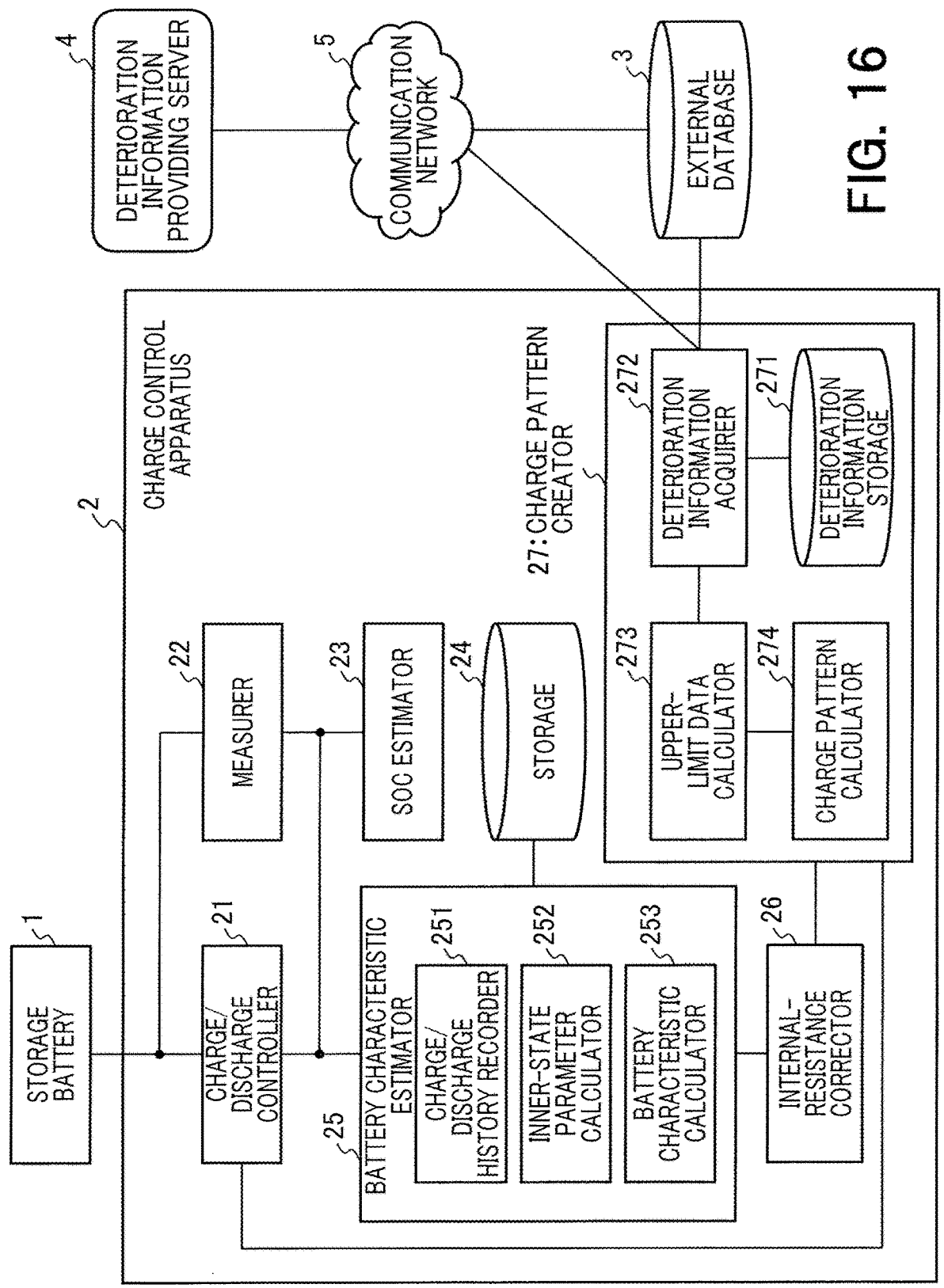
FIG. 16 is a block diagram illustrating an example of a schematic configuration of a power storage system according to a second embodiment.

FIG. 16 is a block diagram illustrating an example of a schematic configuration of a power storage system according to the second embodiment. The second embodiment differs from the first embodiment in that the deterioration information acquirer 272 is connected to the outside in the second embodiment. Descriptions of the features identical to those in first embodiment are omitted.

The deterioration information acquirer 272 is connected to a device or the like that provides deterioration information via wired or wireless communication, or via an electric signal so as to transmit and receive data. The device or the like that provides deterioration information is not limited to a particular device, and may be an external database 3 storing deterioration information or may be a deterioration information providing server 4 that generates and provides deterioration information. Hereinafter, the device or the like that provides deterioration information is referred to as "deterioration information providing device". The deterioration information acquirer 272 may be connected to the deterioration information providing device via a communication network 5. Alternatively, the deterioration information acquirer 272 may be connected directly or indirectly to the external database 3 via a device interface.

Acquisition of deterioration information by the deterioration information acquirer 272 is assumed to be performed when deterioration information corresponding to the storage battery 1 is lacked. However, such a timing is not limited to a particular timing. For example, acquisition may be performed when the deterioration information providing device generates new deterioration information, or may be performed regularly. When necessary deterioration information is not found in the deterioration information storage 271, deterioration information corresponding to the standard, battery characteristics, inner state parameters, or the like of the storage battery 1 is acquired on the basis thereof. Deterioration information may be acquired from the deterioration information providing device without specifying a condition and the like. Deterioration information which has been acquired but is considered not to be necessary may not be stored in the deterioration information storage 271.

The deterioration information storage 271 may delete deterioration information stored therein. For example, for capacity saving, it is not necessary for the deterioration information storage 271 to store therein deterioration information satisfying a predetermined deletion condition, such as expired deterioration information and deterioration information which is seldom used. The deterioration information acquirer 272 may acquire information other than deterioration information. The deterioration information acquirer 272 may be connected to a device or the like other than the deterioration information providing device. For example, the deterioration information acquirer 272 may acquire information on future use of the storage battery 1, from a server or the like managing the storage battery 1. For example, the deterioration information acquirer 272 may acquire information on the future use, the standard to be outputted, the limiting condition, or the like of the storage battery 1. After the battery characteristic estimator 25 predicts the battery characteristics, the inner state parameters, the lifetime, and the like of the storage battery 1 under the future use environment, a process for calculating a charge pattern may be performed on the basis of the prediction.

In addition, the deterioration information acquirer 272 may transmit information to an external device and the like. For example, the deterioration information acquirer 272 may transmit the charge pattern calculated by the charge pattern calculator 274, the deterioration information and an estimation value used in calculation of the charge pattern, and the like to the external device or the like and the external device or the like may output the charge pattern and the like.

Figure 17:
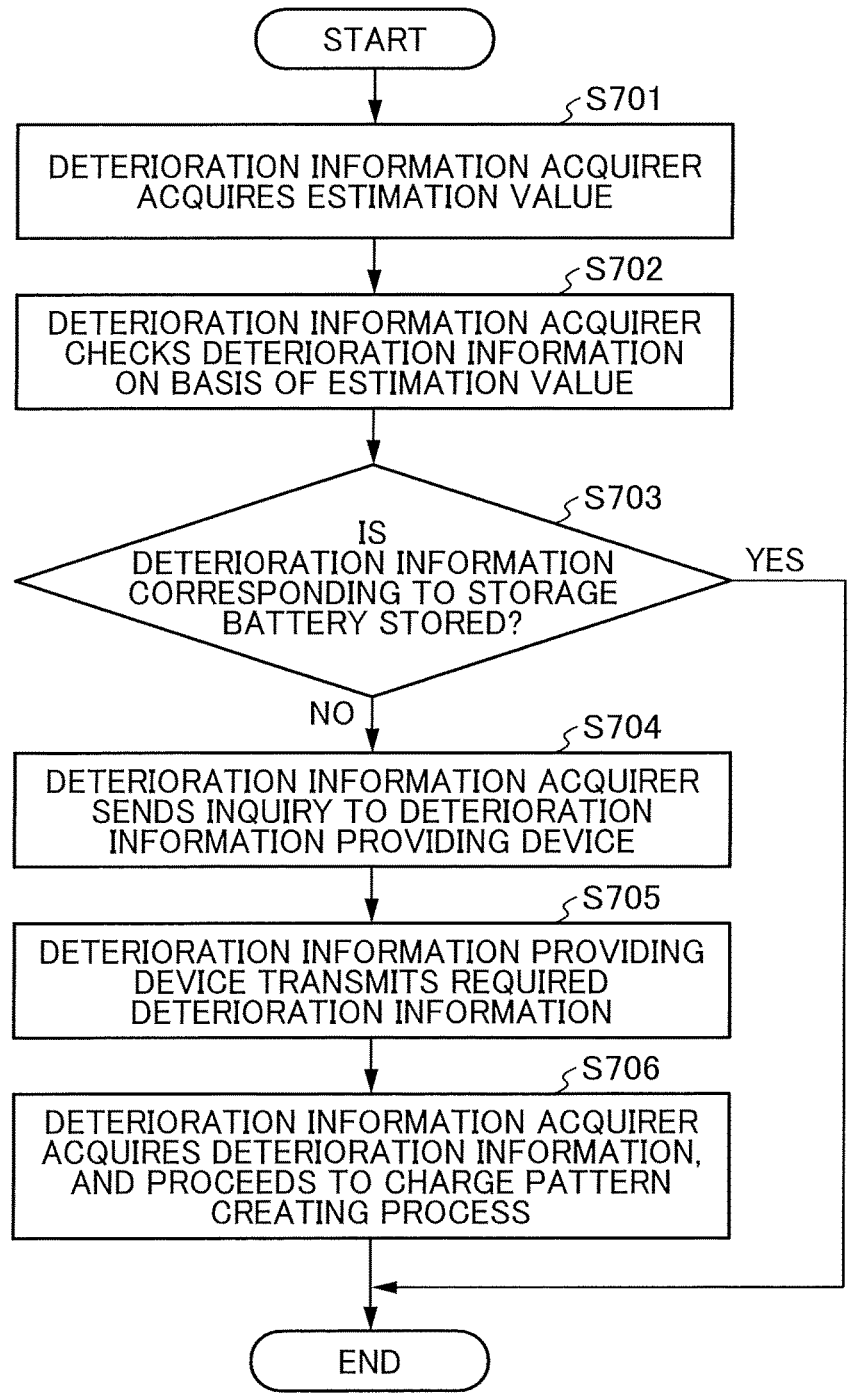
FIG. 17 illustrates an example of a flowchart of a deterioration information acquisition process.

FIG. 17 illustrates an example of a flowchart of a deterioration information acquisition process. The flowchart illustrates a flow in the case where deterioration information is acquired before a charge pattern is created.

The deterioration information acquirer 272 acquires the estimation value of a battery characteristic or the like of the storage battery 1 from the battery characteristic estimator 25 or the internal-resistance corrector 26 (S701). The charge pattern calculator 274 determines whether the deterioration information storage 271 stores therein deterioration information corresponding to the storage battery 1, on the basis of the acquired estimation value (S702).

When the deterioration information storage 271 stores deterioration information corresponding to the storage battery 1 (Yes at S703), the flow is ended. When the deterioration information storage 271 does not store deterioration information corresponding to the storage battery 1 (No at S703), the deterioration information acquirer 272 sends an inquiry to the deterioration information providing device (S704). The inquiry is assumed to include the acquired estimation value.

The deterioration information providing device transmits deterioration information required for calculation of a charge pattern on the basis of the received estimation value of the battery characteristic or the like (S705). Subsequently, the deterioration information acquirer 272 acquires the transmitted deterioration information, and proceeds to the charge pattern creating process (S706). The charge pattern creating process is as above. The flow of the deterioration information acquisition process has been described.

As described above, according to the second embodiment, even if deterioration information required for calculating a charge pattern is not stored in the deterioration information storage 271, required deterioration information can be acquired on the basis of the battery characteristics or the like of the storage battery 1. Therefore, an amount of deterioration information stored in the deterioration information storage 271 can be reduced, and thereby downsizing of the charge pattern creator 27 or reduction in cost for manufacturing the charge pattern creator 27 can be achieved. Moreover, the number of types of the supported storage battery 1 can be increased.

Each process in the embodiments described above can be implemented by software (program). Thus, the embodiments described above can be implemented using, for example, a general-purpose computer apparatus as basic hardware and causing a processor mounted in the computer apparatus to execute the program.

Figure 18:
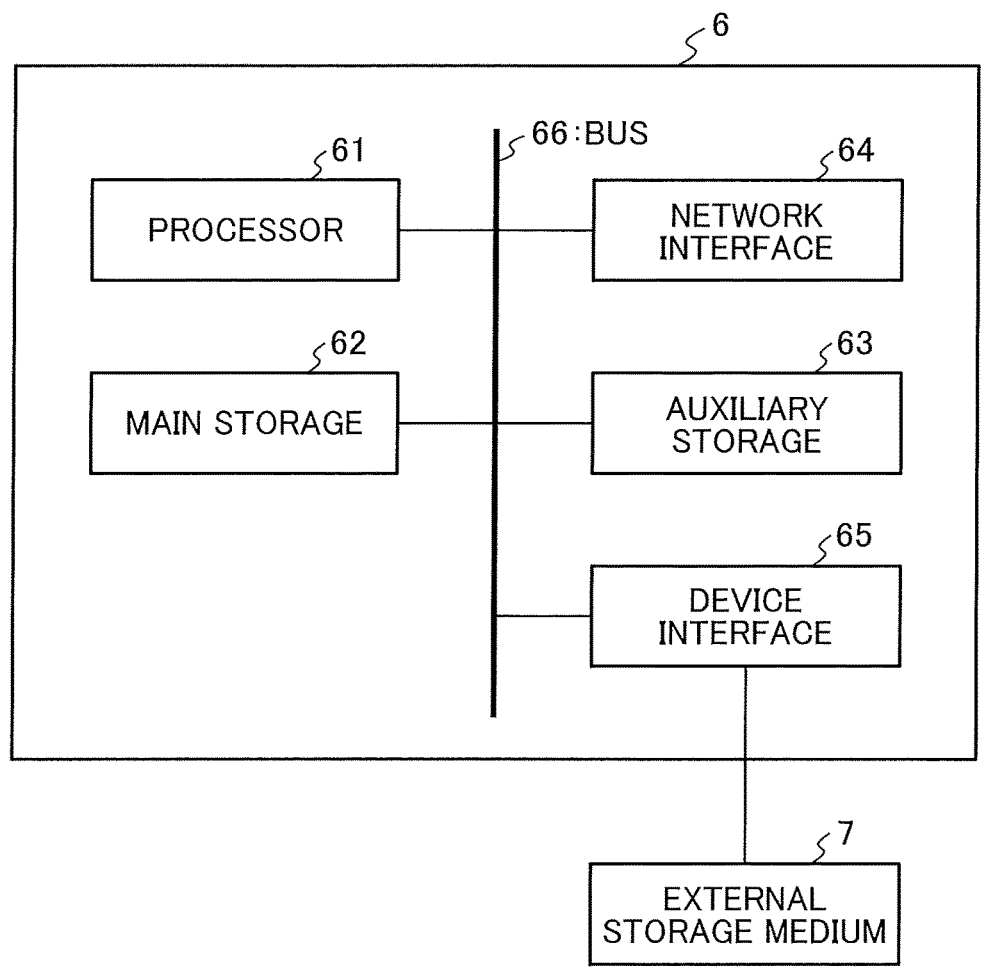
FIG. 18 is a block diagram illustrating an example of a hardware configuration according to an embodiment.

FIG. 18 is a block diagram illustrating an example of a hardware configuration according to an embodiment. The charge control apparatus 2 can be realized by a computer device 6 including a processor 61, a main storage 62, an auxiliary storage 63, a network interface 64, and a device interface 65, which are connected to one another via a bus 66.

The processor 61 reads out a program from the auxiliary storage 63, develops the program onto the main storage 62, and executes the program. As a result of this, functions of the charge/discharge controller 21, the measurer 22, the SOC estimator 23, the battery characteristic estimator 25, the internal-resistance corrector 26, and the charge pattern creator 27 can be achieved.

The processor 61 is an electronic circuit including a controller and a calculator of a computer. As the processor 61, a general-purpose processor, a central processor (CPU), a microprocessor, a digital signal processor (DSP), a controller, a microcontroller, a state machine, an application specific integrated circuit, a field programmable gate array (FPGA), a programmable logic circuit (PLD), or the combination thereof can be used, for example.

The charge control apparatus 2 of the present embodiment may be realized by installing a program to be executed by the components into the computer device 6 in advance, or installing the program, which is stored in a storage medium such as a CD-ROM or the like is distributed via a network, into the computer device 6, as appropriate.

The main storage 62 is a memory that temporarily stores an instruction to be executed by the processor 61, various types of data, and the like, and may be a volatile memory such as a DRAM, or may be a non-volatile memory such as an MRAM. The auxiliary storage 63 is a storage that permanently stores a program, data, and the like. For example, the auxiliary storage 63 is a flash memory, for example.

The network interface 64 is an interface for wired or wireless connection to a communication network. In the case where the deterioration information acquirer 272 communicates with the deterioration information providing device, the communication processing function of the deterioration information acquirer 272 can be realized by the network interface 64. In the drawing, only one network interface 64 is illustrated, but a plurality of the network interfaces 64 may be mounted.

The device interface 65 is an interface such as a USB for connection to an external storage medium 7 that stores therein an output result and the like. In the case where the deterioration information providing device is the external storage medium 7, a function for data exchange between the deterioration information acquirer 272 and the external storage medium 7 can be realized by the device interface 65. The external storage medium 7 may be an arbitrary storage medium such as an HDD, a CD-R, a CD-RW, a DVD-RAM, a DVD-R, a SAN (storage area network), or the like. The external storage medium 7 may be connected to the storage battery 1 via the device interface 65.

The computer device 6 may be configured by dedicated hardware such as a semiconductor integrated circuit having the processor 61 mounted thereon. The dedicated hardware may be configured by combination with a storage such as an RAM or an ROM. The computer device 6 may be incorporated inside the storage battery 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A charge pattern creating device estimating an inner state parameter of a first battery to be charged and calculating a charge pattern for the first battery based on an estimation value of the inner state parameter of the first battery, the charge pattern creating device comprising:
   a battery characteristic estimator configured to estimate the estimation value of the inner state parameter of the first battery based on data on current and voltage of the first battery measured during charge or discharge of the first battery; and
   a charge pattern calculator configured to calculate the charge pattern for the first battery based on a first reference data and a specified value of a first deterioration speed of the first battery, wherein
   the first reference data is reference data considered to correspond to the first battery from the reference data indicating at least a relationship among a second deterioration speed of a secondary battery, one or more reference parameters related to the secondary battery, and a charge current of the secondary battery, wherein the first reference data includes (i) second reference data at least indicating a first relationship among the second deterioration speed of a positive electrode of the secondary battery, the one or more of the reference parameters, and a second upper limit of the positive electrode and (ii) third reference data at least indicating a second relationship among the second deterioration speed of a negative electrode of the secondary battery, the one or more of the reference parameters, and a third upper limit of the charge current in the negative electrode; and
   the charge pattern indicates a value of the charge current corresponding to a first reference parameter which is one of the reference parameters.

2. The charge pattern creating device according to claim 1, further comprising:
   an upper-limit data calculator configured to calculate first upper limit data indicating relationship between the first reference parameter and a first upper limit value of the charge current for obtaining the first deterioration speed equal to or lower than the specified value, based on the first reference data and the specified value of the first deterioration speed, wherein
   the charge pattern calculator calculates the charge pattern based on the first upper limit data.

3. The charge pattern creating device according to claim 2, wherein
   the upper-limit data calculator calculates:
      second upper limit data indicating relationship between the first reference parameter and the second upper limit of the charge current for obtaining the second deterioration speed of the positive electrode equal to or lower than the specified value, and
      third upper limit data indicating relationship between the first reference parameter and the third upper limit for obtaining the second deterioration speed of the negative electrode equal to or lower than the specified value, and the charge pattern calculator calculates the first upper limit data based on the second upper limit data and the third upper limit data.

4. The charge pattern creating device according to claim 3, wherein
the first upper limit is lower than smaller one of the second upper limit and the third upper limit.

5. The charge pattern creating device according to claim 1, wherein
in the charge pattern, a period in which the charge current is supplied is formed of a plurality of sections in which the value of the charge current is constant.

6. The charge pattern creating device according to claim 1, wherein
the first reference parameter is the voltage of the first battery.

7. The charge pattern creating device according to claim 1, wherein
the battery characteristic estimator estimates an estimation value of a battery characteristic based on the inner state parameters, and
necessity of change of the value of the charge current is determined based on the estimation value of the battery characteristic.

8. The charge pattern creating device according to claim 7, wherein
the battery characteristic estimator calculates, as the inner state parameters, respective initial charge amounts and masses of the positive electrode and the negative electrode of the first battery, calculates a battery capacity or an open circuit voltage as the battery characteristic, and regards the calculated values as the estimation values.

9. The charge pattern creating device according to claim 1, further comprising a reference data acquirer configured to acquire the first reference data based on the estimation value.

10. A charge control apparatus comprising:
a charge/discharge controller configured to control charge and discharge of the first battery;
a measurer configured to measure voltage and current of the first battery in charge or discharge of the first battery; and
the charge pattern creating device according to claim 1.

11. The charge control apparatus according to claim 10, wherein
the charge/discharge controller performs charge of the first battery based on the charge pattern calculated by the charge pattern creating device.

12. A method for estimating an inner state parameter of a first battery to be charged and calculating a charge pattern for the first battery based on an estimation value of the inner state parameter of the first battery, the method comprising:
estimating the estimation value of the inner state parameter of the first battery based on data on current and voltage of the first battery measured during charge or discharge of the first battery; and
calculating the charge pattern for the first battery based on a first reference data and a specified value of a first deterioration speed of the first battery, wherein
the first reference data is reference data considered to correspond to the first battery from the reference data indicating at least a relationship among a second deterioration speed of a secondary battery, one or more reference parameters related to the secondary battery, and a charge current of the secondary battery, wherein
the first reference data includes (i) second reference data at least indicating a first relationship among the second deterioration speed of a positive electrode of the secondary battery, the one or more of the reference parameters, and a second upper limit of the positive electrode and (ii) third reference data at least indicating a second relationship among the second deterioration speed of a negative electrode of the secondary battery, the one or more of the reference parameters, and a third upper limit of the charge current in the negative electrode; and
the charge pattern indicates a value of the charge current corresponding to a first reference parameter which is one of the reference parameters.

13. A non-transitory computer readable medium storing a program for estimating an inner state parameter of a first battery to be charged and calculating a charge pattern for the first battery based on an estimation value of the inner state parameter of the first battery, the program causing a computer to execute:
estimating the estimation value of the inner state parameter of the first battery based on data on current and voltage of the first battery measured during charge or discharge of the first battery; and
calculating the charge pattern for the first battery based on a first reference data and a specified value of a first deterioration speed of the first battery, wherein
the first reference data is reference data considered to correspond to the first battery from the reference data indicating at least a relationship among a second deterioration speed of a secondary battery, one or more reference parameters related to the secondary battery, and a charge current of the secondary battery, wherein
the first reference data includes (i) second reference data at least indicating a first relationship among the second deterioration speed of a positive electrode of the secondary battery, the one or more of the reference parameters, and a second upper limit of the positive electrode and (ii) third reference data at least indicating a second relationship among the second deterioration speed of a negative electrode of the secondary battery, the one or more of the reference parameters, and a third upper limit of the charge current in the negative electrode; and
the charge pattern indicates a value of the charge current corresponding to a first reference parameter which is one of the reference parameters.

14. A power storage system comprising:
a first battery to be charged; and
a charge control apparatus configured to charge the first battery, wherein
the charge control apparatus includes:
a battery characteristic estimator configured to estimate an estimation value of an inner state parameter of the first battery based on data on current and voltage of the first battery measured during charge or discharge of the first battery, and
a charge pattern calculator configured to calculate a charge pattern for the first battery based on a first reference data and a specified value of a first deterioration speed of the first battery, wherein
the first reference data is reference data considered to correspond to the first battery from the reference data indicating at least a relationship among a second deterioration speed of a secondary battery, one or more reference parameters related to the secondary battery, and a charge current of the secondary battery, wherein
the first reference data includes (i) second reference data at least indicating a first relationship among the second deterioration speed of a positive electrode of the secondary battery, the one or more of the reference parameters, and a second upper limit of the positive electrode and (ii) third reference data at least indicating a second relationship among the second deterioration speed of a negative electrode of the secondary battery, the one or more of the reference parameters, and a third upper limit of the charge current in the negative electrode, the charge pattern indicates a value of the charge current corresponding to a first reference parameter which is one of the reference parameters; and the first battery is charged along the charge pattern.

* * * * *